(12) United States Patent
Lee et al.

(10) Patent No.: US 11,583,156 B2
(45) Date of Patent: Feb. 21, 2023

(54) STAND FOR CLEANER AND CLEANING APPARATUS HAVING THE SAME

(71) Applicant: SAMSUNG ELECTRONICS CO., LTD., Suwon-si (KR)

(72) Inventors: Donghyun Lee, Suwon-si (KR); Byungjo Lee, Suwon-si (KR); Byeongheon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

(21) Appl. No.: 16/989,262

(22) Filed: Aug. 10, 2020

(65) Prior Publication Data

US 2021/0045604 A1 Feb. 18, 2021

(30) Foreign Application Priority Data

Aug. 14, 2019 (KR) .................. 10-2019-0099455
Mar. 31, 2020 (KR) .................. 10-2020-0038986
Jul. 3, 2020 (KR) .................. 10-2020-0081962

(51) Int. Cl.
*A47L 9/28* (2006.01)
*H02J 7/00* (2006.01)

(52) U.S. Cl.
CPC .......... *A47L 9/2873* (2013.01); *A47L 9/2884* (2013.01); *H02J 7/0045* (2013.01)

(58) Field of Classification Search
CPC ..... A47L 9/2873; A47L 9/2884; H02J 7/0045
See application file for complete search history.

(56) References Cited

U.S. PATENT DOCUMENTS

| 4,225,814 A | 9/1980 | Gantz et al. |
|---|---|---|
| 7,386,916 B2 | 6/2008 | Bone |
| 8,673,487 B2 | 3/2014 | Churchill |
| 2011/0219571 A1 | 9/2011 | Dyson et al. |
| 2018/0125314 A1 | 5/2018 | Kim et al. |
| 2018/0353036 A1* | 12/2018 | Gierer .................. A47L 9/2884 |

FOREIGN PATENT DOCUMENTS

| CN | 105395132 | 3/2016 |
|---|---|---|
| CN | 108695947 | 10/2018 |
| DE | 10 2017 209 161 | 12/2018 |
| EP | 3 412 185 | 12/2018 |
| KR | 20-0165245 | 2/2000 |
| KR | 10-1653449 | 9/2016 |
| KR | 10-2018-0101145 | 9/2018 |

OTHER PUBLICATIONS

International Search Report dated Dec. 4, 2020 from International Application No. PCT/KR2020/010772, 3 pages.
Extended European Search Report dated Aug. 9, 2022 for European Application No. 20852850.5.

* cited by examiner

*Primary Examiner* — Andrew A Horton
(74) *Attorney, Agent, or Firm* — Staas Halsey LLP

(57) ABSTRACT

A stand for a cleaner is capable of holding and charging selectively a cleaner body or a battery. The stand for a cleaner includes a first charging terminal configured to be electrically connected to a cleaner body, a second charging terminal configured to be electrically connected to a battery, and a battery guide configured to guide the battery. The battery guide guides the cleaner body to be connected to the first charging terminal when the battery is mounted to the cleaner body, and is configured to guide the battery to be connected to the second charging terminal when the battery is separated from the cleaner body.

27 Claims, 21 Drawing Sheets

STAND FOR CLEANER AND CLEANING APPARATUS HAVING THE SAME

CROSS-REFERENCE TO RELATED APPLICATION(S)

This application is based on and claims priority under 35 U.S.C. § 119 to Korean Patent Applications No. 10-2019-0099455, filed on Aug. 14, 2019, No. 10-2020-0038986, filed on Mar. 31, 2020, and No. 10-2020-0081962, filed on Jul. 3, 2020 in the Korean Intellectual Property Office, the disclosures of all of which are herein incorporated by reference in their entireties.

BACKGROUND

1. Field

The disclosure relates to a stand for a cleaner and a cleaning apparatus having the same, and more particularly, to a stand for a cleaner having improved usability by improving a structure, and a cleaning apparatus having the same.

2. Description of Related Art

In general, a cleaner is a household appliance that sucks air containing foreign substances, such as dust, by using a vacuum pressure generated by a motor mounted in a body of the cleaner, and then filters out the foreign substances inside the body of the cleaner.

The cleaner may include the motor that generates a suction pressure and a suction unit that sucks foreign substances on a surface to be cleaned through a suction pressure generated by the motor. The cleaner may be classified into a canister type cleaner, an upright type cleaner, a handheld type cleaner, and a stick type cleaner.

In recent years, a cordless cleaner that is easy to use has been popular. A cleaning apparatus including the cordless cleaner may include the cleaner and a stand for the cleaner configured to store and charge the cleaner after the cleaner is used.

In order to increase a use time of the cordless cleaner, a battery coupled to a cleaner body may be provided removably from the cleaner body. When the battery is provided removably from the cleaner body, a user may have a plurality of batteries and use the cleaner while replacing the batteries.

Depending on the user preference, a user may charge the battery in a state of being coupled to the cleaner body, or a user may separate the battery from the cleaner body and then charge the battery only.

However, a stand for a cleaner for holding and charging a cleaner body, to which a battery is coupled, and a stand for a cleaner for holding and charging a battery separated from the cleaner body have different structures, and thus it is common that only one stand is enclosed when purchasing the product. Therefore, a user must additionally purchase a stand, which is not enclosed when purchasing the product, in order to use both types of charging methods.

SUMMARY

Therefore, it is an aspect of the disclosure to provide a stand for a cleaner capable of holding and charging selectively a cleaner body or a battery, and a cleaning apparatus having the same.

It is another aspect of the disclosure to provide a stand for a cleaner capable of holding and charging a cleaner body or a battery in various manners, and a cleaning apparatus having the same.

It is another aspect of the disclosure to provide a stand for a cleaner having improved productivity by reducing the number of components, and a cleaning apparatus having the same.

Additional aspects of the disclosure will be set forth in part in the description which follows and, in part, will be clear from the description, or may be learned by practice of the disclosure.

In accordance with an aspect of the disclosure, a stand for a cleaner includes a first charging terminal configured to be electrically connected to a cleaner body, a second charging terminal configured to be electrically connected to a battery, and a battery guide configured to guide the battery to allow the cleaner body to be connected to the first charging terminal when the battery is mounted to the cleaner body, and configured to guide the battery to be connected to the second charging terminal when the battery is separated from the cleaner body.

The battery may be arranged to face a first direction when the battery is mounted to the cleaner body and the cleaner body is electrically connected to the first charging terminal.

The battery may be arranged to face a second direction opposite to the first direction when the battery is separated from the cleaner body and the battery is electrically connected to the second charging terminal.

The battery guide may guide the battery when the battery is arranged in the first direction or the second direction.

The stand for a cleaner may further include a first seating portion on which the cleaner body is seated to allow the cleaner body to be electrically connected to the first charging terminal, and a second seating portion on which the battery is seated to be electrically connected to the second charging terminal.

The battery may be provided to come into contact with a lower end of the battery guide when the cleaner body is seated on the first seating portion.

The battery may be provided to be spaced a predetermined distance from the lower end of the battery guide when the battery is seated on the second seating portion.

The second seating portion may be provided to be located in an upper side of the first seating portion.

The stand for a cleaner may further include an auxiliary guide configured to guide the battery to be connected to the second charging terminal.

The auxiliary guide may be disposed at a rear side of the battery guide, and a length of the auxiliary guide in a vertical direction may be less than a length of the battery guide in the vertical direction.

The auxiliary guide may include a pair of auxiliary guides, and the battery guide may include a pair of battery guides, and a distance between the pair of auxiliary guides may be less than a distance between the pair of battery guides.

When the cleaner body is electrically connected to the first charging terminal this is referred to as a first connection, and when the battery is electrically connected to the second charging terminal this is referred to as a second connection, and the stand for a cleaner may selectively provide the first connection and the second connection.

The stand for a cleaner may further include a holding portion including the first charging terminal, the second charging terminal, and the battery guide.

The stand for a cleaner may further include a suction unit holding part to which a suction unit of the cleaner body removably coupled.

The suction unit holding part may be rotatably coupled to the holding portion.

The suction unit holding part may include a connection port configured to be inserted into the suction unit.

The connection port may be arranged to face upward or downward according to a rotation of the suction unit holding part.

The suction unit holding part may be configured to be rotatable with respect a rotating shaft located on a rear side of a lower surface of the holding portion.

The rotating shaft may be located on an outside of the connection port.

The suction unit holding part may be arranged on a rear side of the holding portion when the connection port is arranged to face upward.

The suction unit holding part may be arranged on a lower side of the holding portion when the connection port is arranged to face downward.

When the holding portion is arranged to stand on a floor, the lower surface of the holding portion may be arranged at a predetermined angle with respect to the floor.

The stand for a cleaner may further include a holding portion including the first charging terminal, the second charging terminal, and the battery guide, and a fixer configured to be rotatably coupled to the holding portion, and including an upper holder and a lower holder configured to be movable respect to the upper holder.

The fixer may be configured to grasp a structure between the upper holder and the lower holder by adjusting a distance between the lower holder and the upper holder.

The fixer may further include a lever configured to be rotatable so as to adjust the distance between the lower holder and the upper holder.

The lever may move the lower holder in a direction closer to the upper holder or move the lower holder in a direction away from the upper holder according to a rotation direction thereof.

The fixer may further include a suction unit holding part to which a suction unit of the cleaner body is removably coupled.

The suction unit holding part may include a connection port configured to be inserted into the suction unit and arranged on a lateral side of the holding portion.

In accordance with another aspect of the disclosure, a cleaning apparatus includes a cleaner body configured to allow a suction unit and a battery to be mountable thereto, and a stand for a cleaner to which the cleaner body is held. The stand for a cleaner includes a first charging terminal configured to be electrically connected to the cleaner body to which the battery is mounted, a first seating portion on which the cleaner body is seated to be connected to the first charging terminal, a second charging terminal configured to be electrically connected to the battery separated from the cleaner body, and a second seating portion on which the battery is seated to be connected to the second charging terminal, and located above the first seating portion and located behind the first seating portion.

The battery may be electrically connected to the first charging terminal through the cleaner body by being mounted to the cleaner body, and the battery may be electrically connected to the second charging terminal by being seated on the second seating portion.

The stand for a cleaner may further include a battery guide configured to guide the battery to allow the cleaner body to be connected to the first charging terminal when the cleaner body is seated on the first charging terminal, and configured to guide the battery to be connected to the second charging terminal when the battery is seated on the second charging terminal.

The battery may be provided to come into contact with a lower end of the battery guide when the cleaner body is seated on the first seating portion.

The battery may be provided to be spaced a predetermined distance from the lower end of the battery guide when the battery is seated on the second seating portion.

The battery may be arranged to face a first direction when the cleaner body is seated on the first seating portion.

The battery may be arranged to face a second direction opposite to the first direction when the battery is seated on the second seating portion.

The stand for a cleaner may further include a holding portion including the first charging terminal, the second charging terminal, the first seating portion, and the second seating portion.

The stand for a cleaner may further include a suction unit holding part to which a suction unit of the cleaner body is removably coupled.

The suction unit holding part may be rotatably coupled to the holding portion.

The suction unit holding part may include a connection port configured to be inserted into the suction unit.

The connection port may be arranged to face upward or downward according to a rotation of the suction unit holding part.

In accordance with another aspect of the disclosure, a stand for a cleaner includes a first charging terminal configured to be electrically connected to a cleaner body, a second charging terminal configured to be electrically connected to a battery, a battery guide configured to guide a movement of the battery when the cleaner body is connected to the first charging terminal or when the battery is connected to the second charging terminal, and a suction unit holding part configured to hold a suction unit mounted to the cleaner body, and configured to be rotatable to allow the suction unit to face upward or downward.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
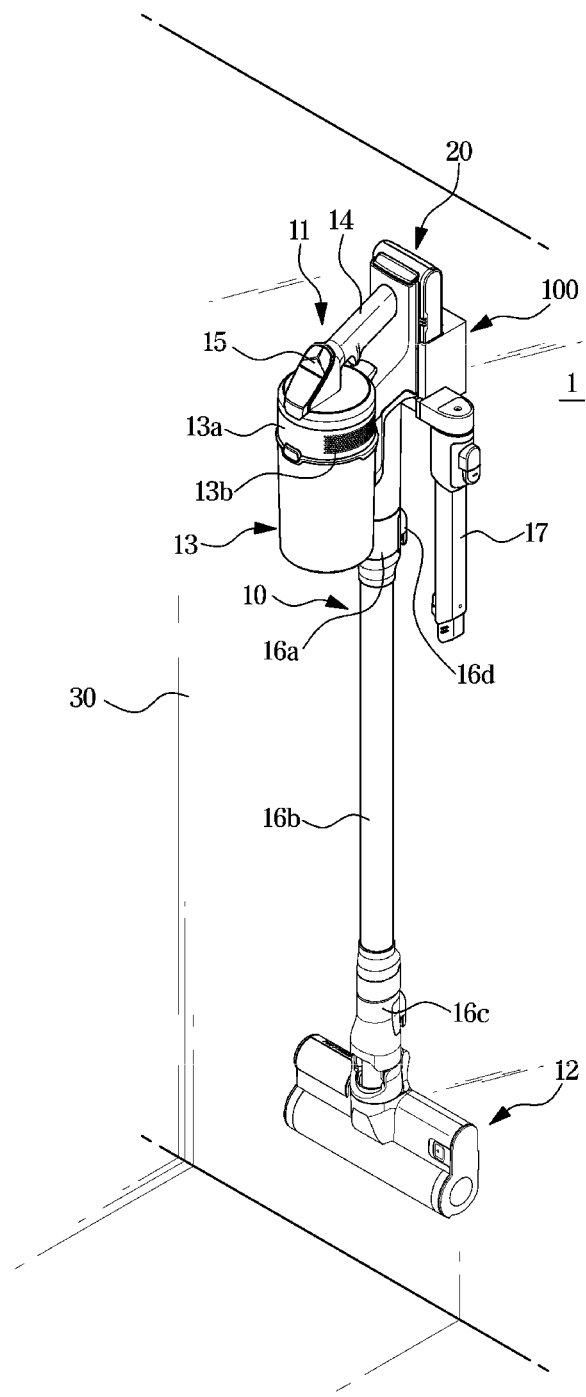
FIG. 1 is a perspective view of a cleaning apparatus according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front end", "rear end", "upper portion", "lower portion", "upper end", "lower end" and the like may be defined by the drawings, but the shape and the location of the component is not limited by the term.

The disclosure will be described more fully hereinafter with reference to the accompanying drawings.

FIG. 1 is a perspective view of a cleaning apparatus according to an embodiment of the disclosure.

Referring to FIG. 1, a cleaning apparatus 1 may include a cleaner 10 and a stand for a cleaner 100.

The cleaner 10 may include a cleaner body 11, an extension tube 16b removably coupled to the cleaner body 11, a main suction unit 12 removably coupled to the extension tube 16b, and a dust collector 13 removably coupled to the cleaner body 11.

The cleaner body 11 may include a suction motor (not shown) configured to generate a suction force needed to suck foreign substances on a surface to be cleaned, and the dust collector 13 in which foreign substances sucked from the surface to be cleaned are accommodated.

The dust collector 13 may be arranged upstream of an air flow rather than the suction motor so as to filter out and collect dust or dirt in the air flowing through the main suction unit 12. The dust collector 13 may be provided detachably from the cleaner body 11.

The cleaner 10 may include a filter housing 13a. The filter housing 13a is provided in a substantially donut shape to accommodate a filter (not shown) therein. There is no limitation in the type of filter, but, for example, a high-efficiency particulate air (HEPA) filter may be disposed in the inside of the filter housing 13a. The filter may filter out ultrafine dust that is not filtered out by the dust collector 13. The filter housing 13a may include a plurality of holes 13b to discharge air passing through the filter to the outside of the cleaner 10.

The cleaner body 11 may include a handle 14 gripped by a user to allow the user to operate the cleaner 10. The user can grip the handle 14 and move the cleaner 10 in a front and rear direction.

The cleaner body 11 may include an operator 15. The user can turn on/off the cleaner 10 or adjust suction strength by operating a power button or the like provided on the operator 15.

The main suction unit 12 may be configured to be in contact with a surface to be cleaned. The main suction unit 12 may be configured to come into contact with the surface to be cleaned to suck foreign substances such as dust placed on the surface to be cleaned.

The main suction unit 12 and the cleaner body 11 may be connected by the extension tube 16b. One end of the extension tube 16b may be pivotally connected to the main suction unit 12 and thus the main suction unit 12 may perform a joint motion with respect to the extension tube 16b.

The cleaner body 11 may include an extension tube connecting portion 16a. The extension tube connecting portion 16a may be configured to separate the extension tube 16b from the cleaner body 11 or configured to couple the extension tube 16b to the cleaner body 11.

The cleaner body 11 may include an extension tube separation button 16d. A user can separate the extension tube 16b from the cleaner body 11 by pressing the extension tube separation button 16d. After the user separates the extension tube 16b from the cleaner body 11, the user can directly couple the main suction unit 12 or an auxiliary suction unit 17 to the cleaner body 11.

A suction unit connecting portion 16c may be provided at the other end opposite to one end of the extension tube 16b connected to the cleaner body 11. The suction unit connecting portion 16c may be configured to separate the main suction unit 12 from the cleaner body 11 or configured to couple the main suction unit 12 to the cleaner body 11. The auxiliary suction unit 17 may be removably coupled to the suction unit connecting portion 16c.

The cleaner 10 may replace the main suction unit 12 with the auxiliary suction unit 17 according to the condition of the surface to be cleaned. For example, the auxiliary suction unit 17 may be an auxiliary suction unit configured to include a brush, or an auxiliary suction unit provided in a shape with a narrow opening for cleaning a narrow gap. There is no limitation in the type of the auxiliary suction unit, and thus the auxiliary suction unit may be provided in various forms.

The auxiliary suction unit 17 in a non-use state may be stored by being coupled to a suction unit holding part 170 (refer to FIG. 2) of the stand for a cleaner 100. Particularly, the auxiliary suction unit 17 may be stored by being coupled to a connection port 175 (refer to FIG. 2) of the suction unit holding part. Because the suction unit holding part 170 is rotatably coupled to a holding portion 110 (refer to FIG. 7), the suction unit holding part 170 may be arranged to place the connection port 175 facing up or down depending on the use of the stand for cleaner 100.

The cleaner 10 may include a battery 20 configured to provide a driving force to the cleaner 10. The battery 20 may be removably mounted to the cleaner body 11. The battery 20 may be electrically connected to a second charging terminal 131 (refer to FIG. 2) provided in the stand for a cleaner 100. The battery 20 may be charged by receiving power from the second charging terminal 131.

The cleaner body 11 may be electrically connected to a first charging terminal 121 provided in the stand for a cleaner 100. When the cleaner body 11 is electrically connected to the first charging terminal 121, the battery 20 coupled to the cleaner body 11 may be charged by receiving electric power from the first charging terminal 121.

The cleaning apparatus 1 may include an auxiliary battery (not shown). The auxiliary battery has the same configuration as the battery 20. Therefore, when the battery 20 mounted to the cleaner body 11 is discharged, a user can replace the discharged battery 20 with the auxiliary battery and then continue cleaning. Accordingly, an operating time of the cleaner 10 may be increased.

The stand for a cleaner 100 may be configured to allow the cleaner 10 to be stored or held. The cleaner 10 may be charged in the stand for cleaner 100. The stand for a cleaner 100 may be supported on a wall surface 30 through the holding portion 110 (refer to FIG. 7) fixed to the wall surface 30.

Figure 2:
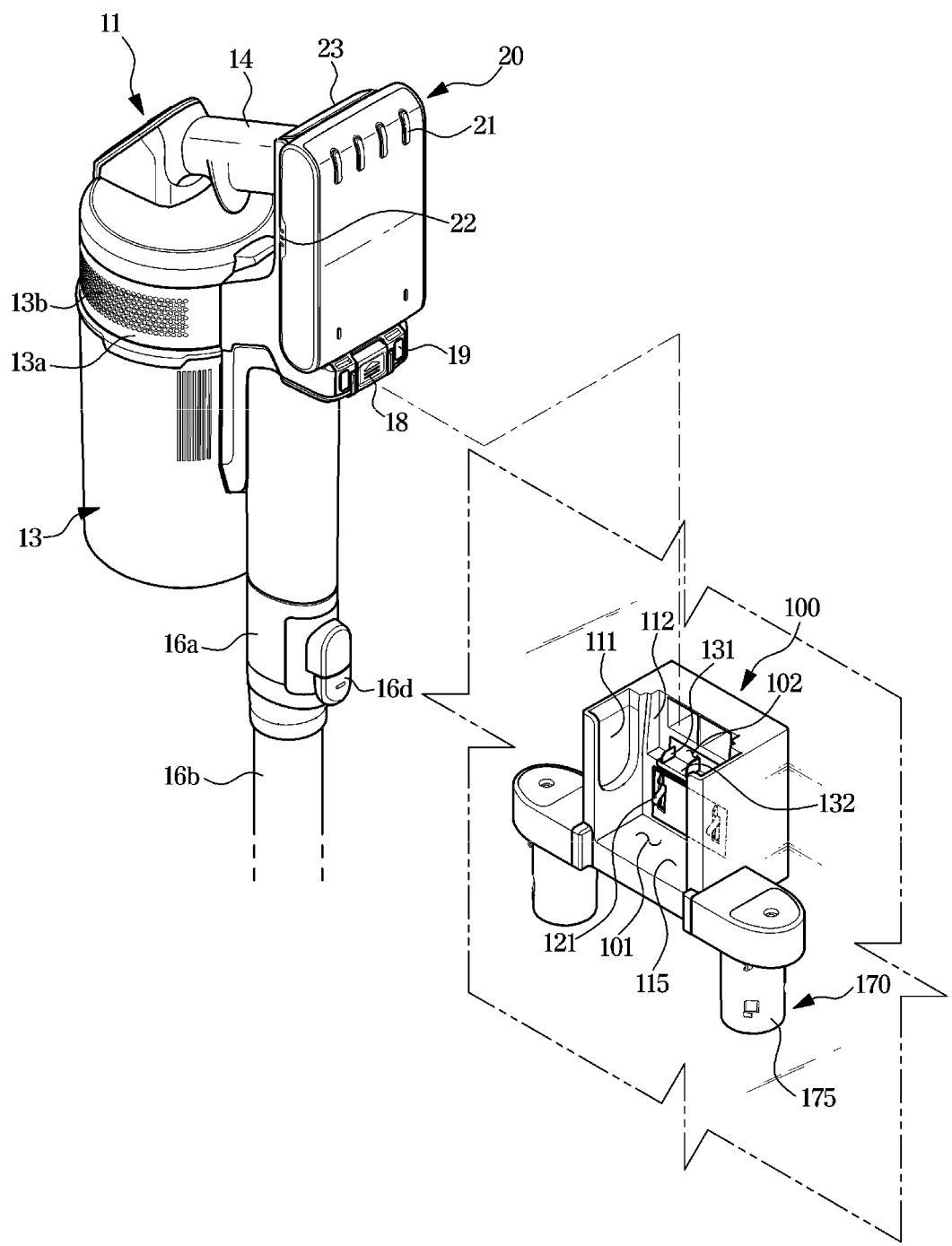
FIG. 2 is a view illustrating a state in which a cleaner is separated from a stand for a cleaner in the cleaning apparatus according to an embodiment of the disclosure.
Figure 3:
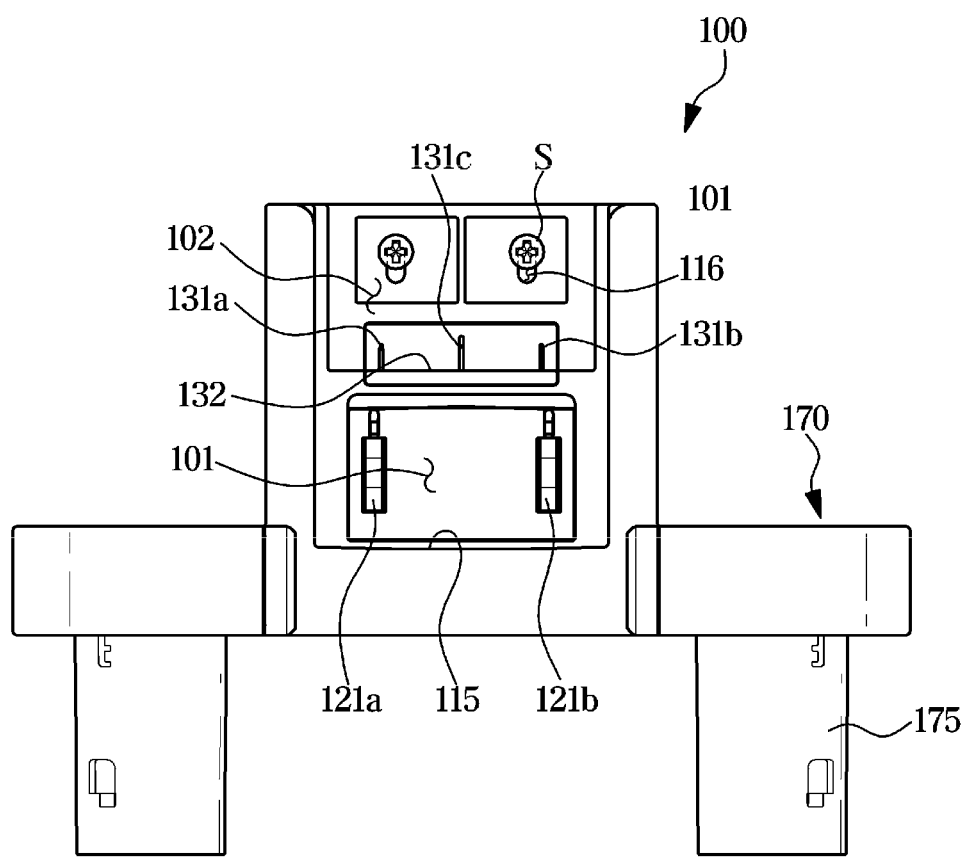
FIG. 3 is a view of the stand for a cleaner according to an embodiment of the disclosure.

FIG. 2 is a view illustrating a state, in which a cleaner is separated from a stand for a cleaner, in the cleaning apparatus according to an embodiment of the disclosure, and FIG. 3 is a view of the stand for a cleaner according to an embodiment of the disclosure.

Referring to FIG. 2, the stand for a cleaner 100 may include the first charging terminal 121 configured to be electrically connected to the cleaner body 11 and the second charging terminal 131 configured to be electrically connected to the battery 20. In addition, the stand for a cleaner 100 may include a battery guide 111 configured to guide the battery 20, which is coupled to the cleaner body 11, so as to allow the cleaner body 11 to be electrically connected to the first charging terminal 121 upon seating of the cleaner 10 on the stand for a cleaner 100. Further, the battery guide 111 may be configured to guide the battery 20 to be electrically connected to the second charging terminal 131 when the battery 20 is separated from the cleaner body 11 and then independently seated on the stand for a cleaner 100.

According to the disclosure, the stand for a cleaner 100 may hold and charge the cleaner 10, and may also hold and charge the battery 20 separated from the cleaner body 11. Therefore, the stand for a cleaner 100 as one configuration may hold and charge selectively the cleaner 10 and the battery 20.

The cleaner body 11 may include a battery separation button 18 configured to separate the battery 20 from the cleaner body 11, and a connection terminal 19 configured to receive power from the first charging terminal 121 by being in contact with the first charging terminal 121.

The battery 20 may be charged when the cleaner body 11 to which the battery 20 is coupled, that is, the cleaner 10 is held on the stand for a cleaner 100. The battery 20 may be charged by receiving power through the first charging terminal 121 and the connection terminal 19.

The battery 20 may include a non-slip portion 21 provided to allow a user to easily grip the battery 20, and a residual amount display 22 configured to display an remaining amount of the battery 20, and a protrusion 23. The protrusion 23 may be provided in a shape protruding from one surface of the battery 20 and having an area less than one surface of the battery 20.

Referring to FIGS. 1 and 2, when the battery 20 is coupled to the cleaner body 11, the non-slip portion 21 may be arranged to face the stand for a cleaner 100. In other words, when the battery 20 is coupled to the cleaner body 11, the protrusion 23 may be arranged to face the cleaner body 11. Accordingly, when the cleaner 10 is held on the stand for a cleaner 100 and charged, the battery 20 may be arranged to allow the non-slip portion 21 to face the stand for a cleaner 100.

The stand for a cleaner 100 may include the first charging terminal 121 configured to be electrically connected to the connection terminal 19 of the cleaner 10, and a first seating portion 101 provided to allow the cleaner 10 to be seated thereon. A first supporting surface 115 and the first charging terminal 121 may be provided in the first seating portion 101.

The stand for a cleaner 100 may include the second charging terminal 131 configured to be electrically connected to the battery 20 by being inserted into a terminal groove (not shown) of the battery 20, and a second seating portion 102 provided to allow the battery 20 to be seated thereon. A second supporting surface 132 and the second charging terminal 131 may be provided in the second seating portion 102.

When the cleaner 10 is held on the stand for a cleaner 100, the first supporting surface 115 may support the cleaner 10 by being in contact with the cleaner 10. However, the disclosure is not limited thereto, and the first supporting surface 115 may not be in contact with the cleaner 10. In this case, the cleaner 10 may be supported by the battery guide 111.

As illustrated in FIGS. 1 and 2, when the stand for a cleaner 100 is fixed to the wall surface 30, the suction unit holding part 170 may be arranged to place the connection port 175 facing down. Through this arrangement, the auxiliary suction unit 17 coupled to the suction unit holding part 170 may be stored more stably.

The battery guide 111 may be configured to guide the battery 20, and may be provided in a groove shape corresponding to a side shape of the battery 20. The battery guide 111 may be provided in a pair.

The battery guide 111 may be configured to guide the battery 20 upon seating of the cleaner 10 on the stand for a cleaner 100 or upon seating of the battery 20 on the stand for a cleaner 100. The battery guide 111 may guide the battery 20 to allow the connection terminal 19 to be in contact with the first charging terminal 121 upon seating of the cleaner 10 on the stand for a cleaner 100. Further, the battery guide 111 may guide the battery 20 to be electrically connected to the second charging terminal 131 upon seating of the battery 20 on the stand for a cleaner 100.

Referring to FIG. 3, the stand for a cleaner 100 may be coupled to be fixed to the wall surface 30. The stand for a cleaner 100 may include a hole 116 penetrating one surface of the holding portion 110 provided to face the wall surface 30. The stand for a cleaner 100 may be fixed to the wall surface 30 by inserting a fastening member S into the hole 116 and by engaging the fastening member S to the wall surface 30. The hole 116 may be provided in a pair, and there is no limitation in the number of the hole 116. As described above, when the stand for a cleaner 100 is used in a state of being coupled to the wall surface 30, it will be referred to as that the stand for a cleaner 100 is used as a wall-mounted type.

Figure 4:
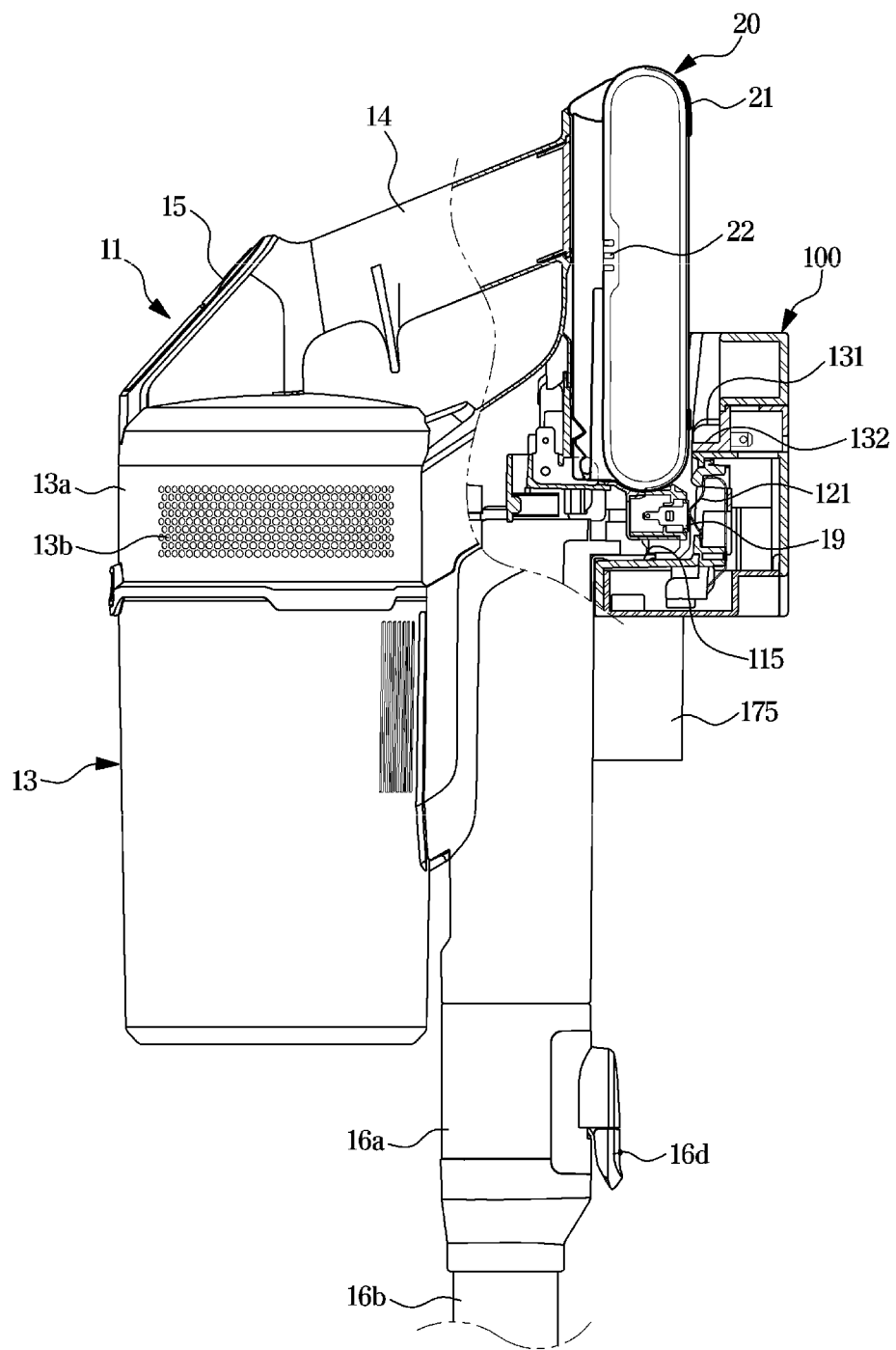
FIG. 4 is a side cross-sectional view of the stand for a cleaner, to which the cleaner is coupled, in the cleaning apparatus according to an embodiment of the disclosure.

FIG. 4 is a side cross-sectional view of the stand for a cleaner 100, to which the cleaner is coupled, in the cleaning apparatus according to an embodiment of the disclosure.

Referring to FIG. 4, when the cleaner 10 is coupled to the stand for a cleaner 100, the cleaner 10 may be seated on the first seating portion 101 (refer to FIG. 2). In addition, when the cleaner 10 is coupled to the stand for a cleaner 100, the connection terminal 19 may be arranged to be in contact with the first charging terminal 121. As described above, when the connection terminal 19 is in contact with the first charging terminal 121, the connection terminal 19 and the first charging terminal 121 may be electrically connected to each other. Further, when the cleaner 10 is coupled to the stand for cleaner 100, the battery 20 may be arranged to allow the terminal groove (not shown), to which the second charging terminal 131 is inserted, to face the cleaner body 11. In other words, the protrusion 23 of the battery 20 may be arranged to face the cleaner body 11 and the non-slip portion 21 of the battery 20 may be arranged to face the stand for a cleaner 100. Hereinafter this arrangement will be referred to as that the battery 20 is arranged in a first direction with respect to the stand for cleaner 100.

Figure 5:
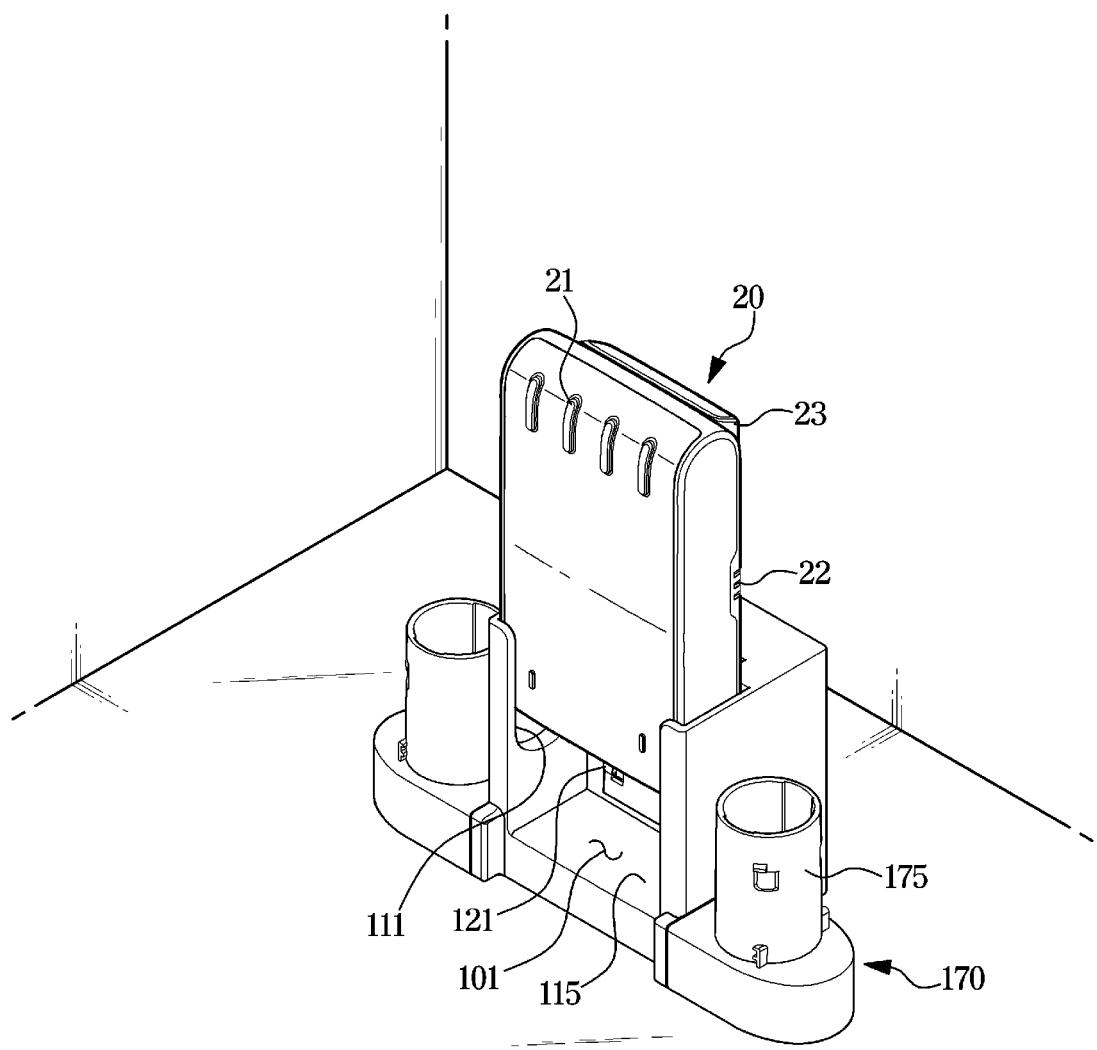
FIG. 5 is a view of the stand for a cleaner, to which a battery is coupled, in the cleaning apparatus according to an embodiment of the disclosure.
Figure 6:
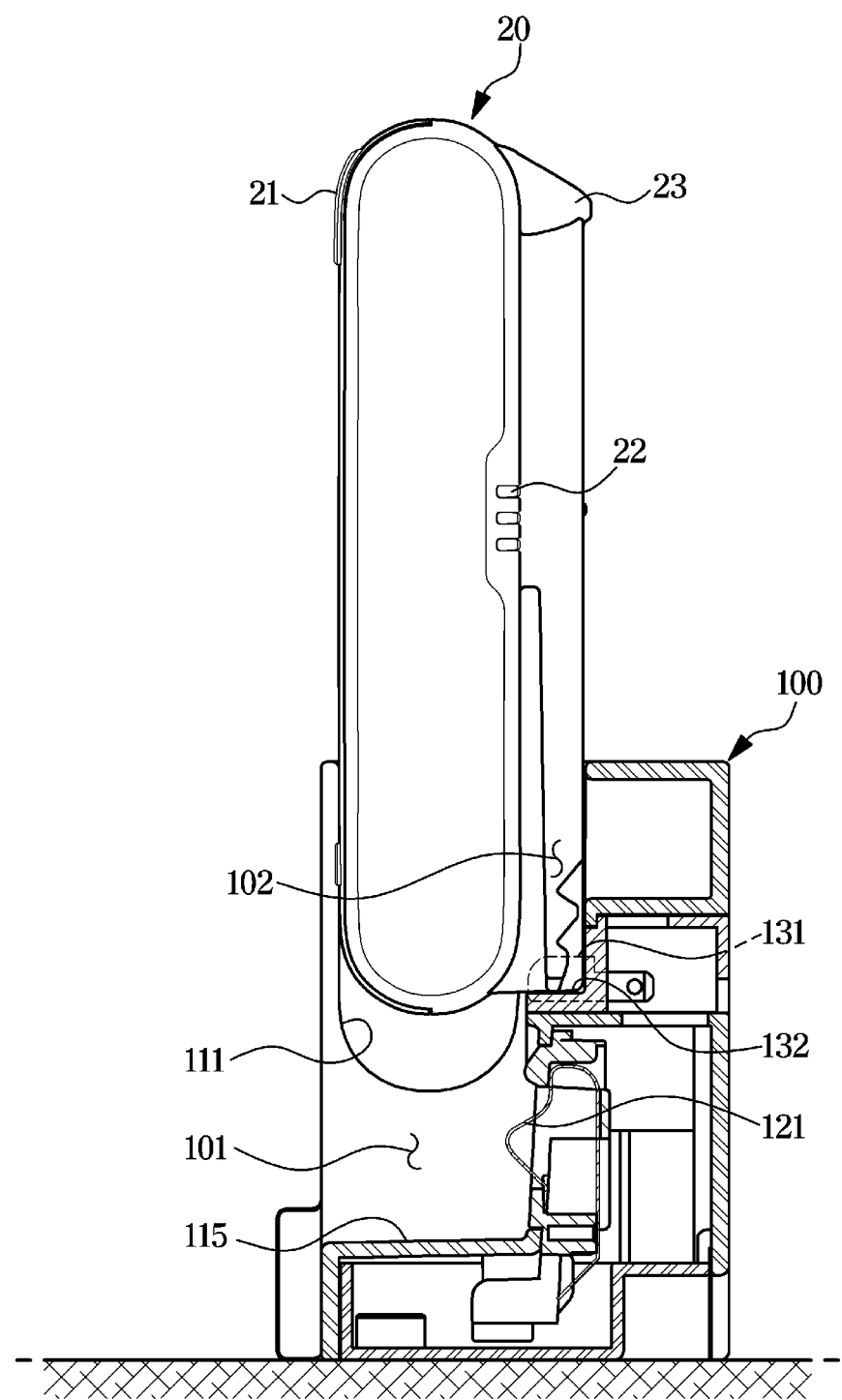
FIG. 6 is a side cross-sectional view of the stand for a cleaner, to which the battery is coupled, in the cleaning apparatus according to an embodiment of the disclosure.

FIG. 5 is a view of the stand for a cleaner, to which a battery is coupled, in the cleaning apparatus according to an embodiment of the disclosure, and FIG. 6 is a side cross-sectional view of the stand for a cleaner, to which the battery is coupled, in the cleaning apparatus according to an embodiment of the disclosure.

Unlike the description in FIGS. 1 to 4, the stand for a cleaner 100 according to an embodiment of the disclosure may be arranged on a floor with reference to FIGS. 5 and 6. As described above, when the stand for a cleaner 100 is arranged on the floor, it will be referred to as that the stand for a cleaner 100 is used as a battery charging type.

When the stand for a cleaner 100 is arranged on the floor, the suction unit holding part 170 may be arranged to place the connection port 175 facing up. This is because when the suction unit holding part 170 is arranged to place the connection port 175 facing down, the holding portion 110 may not be in contact with the floor and the stand for cleaner 100 may be difficult to be stably supported by the floor. According to an embodiment of the disclosure, the suction unit holding part 170 may be provided in a pair. However, the disclosure is not limited thereto, and thus one or three or more suction unit holding parts 170 may be provided.

When the suction unit holding part 170 is provided in plural, each of the plurality of suction unit holding parts may be rotatable independently of each other. For example, the suction unit holding part arranged on the left side of the holding portion 110 (see FIG. 7) may be arranged to face upward, and the suction unit holding part arranged on the right side of the holding portion 110 may be arranged to face downward.

According to an embodiment of the disclosure, the suction unit holding part 170 is rotatably coupled to opposite sides of the holding portion 110, but is not limited thereto. For example, the suction unit holding part 170 may be rotatably coupled to an extension (not shown) extending rearward from the holding portion 110. The suction unit holding part 170 may be arranged adjacent to the holding portion 110, and configured to be rotatable and further placed at any position.

In addition, the suction unit holding part may be provided in plural, and the plurality of suction unit holding parts may be provided to be rotatable with respect to the holding portion.

According to the disclosure, the suction unit holding part may be provided in plural, and each of the plurality of suction unit holding parts may be provided to be rotatable independently of each other, or alternatively, the plurality of suction unit holding parts may be provided to be simultaneously rotatable.

When the stand for a cleaner 100 is used as the battery charging type, the battery 20 may be separated from the cleaner body 11 and held on the stand for a cleaner 100. At this time, the battery 20 may be disposed in such a way that the protrusion 23 faces the stand for a cleaner 100. Hereinafter this arrangement will be referred to as that the battery 20 is arranged in a second direction with respect to the stand for cleaner 100.

The battery guide 111 may be configured to guide the battery 20 when the battery 20 is arranged in the first and second direction with respect to the stand for cleaner 100. When the battery 20 is coupled to the cleaner body 11 and arranged in the first direction, the battery guide 111 may guide the battery 20 to allow the cleaner 10 to be seated on the first seating portion 101. When the battery 20 is separated from the cleaner body 11 and arranged in the second direction, the battery guide 111 may guide the battery 20 to be seated on the second seating portion 102.

Referring to FIGS. 4 and 5, when the cleaner body 11 is seated on the first seating portion 101, the battery 20 may be provided to come into contact with a lower end of the battery guide 111. In addition, when the battery 20 is seated on the second seating portion 102, the battery 20 may be arranged to be spaced a predetermined distance from the lower end of the battery guide 111. That is, the second seating portion 102 may be positioned on an upper side of the first seating portion 101.

When the battery 20 is seated on the second seating portion 102 and then electrically connected to the second charging terminal 131, the second supporting surface 132 may be in contact with a lower surface of the battery 20 and support the battery 20. Because the second supporting surface 132 supports the battery 20, the battery 20 may be fixed to an upper side of the first seating portion 101 without moving to the first seating portion 101. Particularly, the second supporting surface 132 may support a lower surface of the protrusion 23 of the battery 20. The protrusion 23 of the battery 20 may be located in the second seating portion 102.

In addition, an auxiliary guide 112 (refer to FIG. 7), which is provided on the holding portion 110, may guide the protrusion 23 of the battery 20 when the battery 20 is seated on the second seating portion 102. The auxiliary guide 112 may be in contact with opposite sides of the protrusion 23 to guide the battery 20 to be seated on the second seating portion 102. A distance between the pair of auxiliary guides 112 may be less than a distance between the pair of battery guides 111. The second supporting surface 132 may be arranged between the pair of auxiliary guides 112.

The second seating portion 102 may be located above the first seating portion 101. In addition, the second seating portion 102 may be located in an inner side or in a rear side of the first seating portion 101. Interference may not occur between the first charging terminal 121 in the first seating portion 101 and the second charging terminal 131 in the second seating portion 102 because the first seating portion 101 and the second seating portion 102 are located at different positions. When the cleaner 10 is seated on the first seating portion 101, the second charging terminal 131 may not be electrically connected to the battery 20, and when the battery 20 is seated on the second seating portion 102, the first charging terminal 121 may not be electrically connected to the battery 20. Accordingly, the first charging terminal 121 and the second charging terminal 131 may be selectively electrically connected to the connection terminal 19 or the battery 20.

Figure 7:
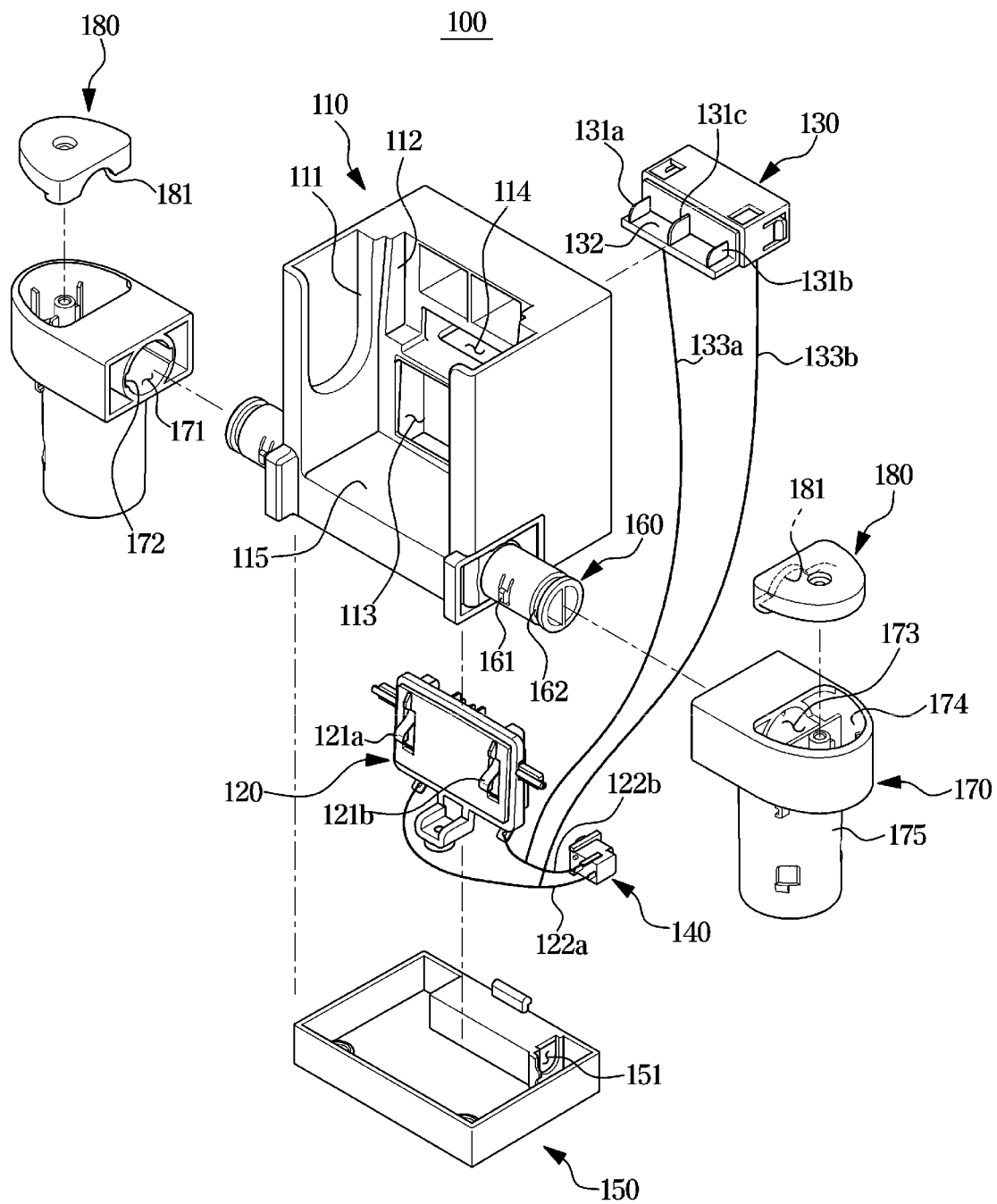
FIG. 7 is an exploded perspective view of the stand for a cleaner according to an embodiment of the disclosure.
Figure 8:
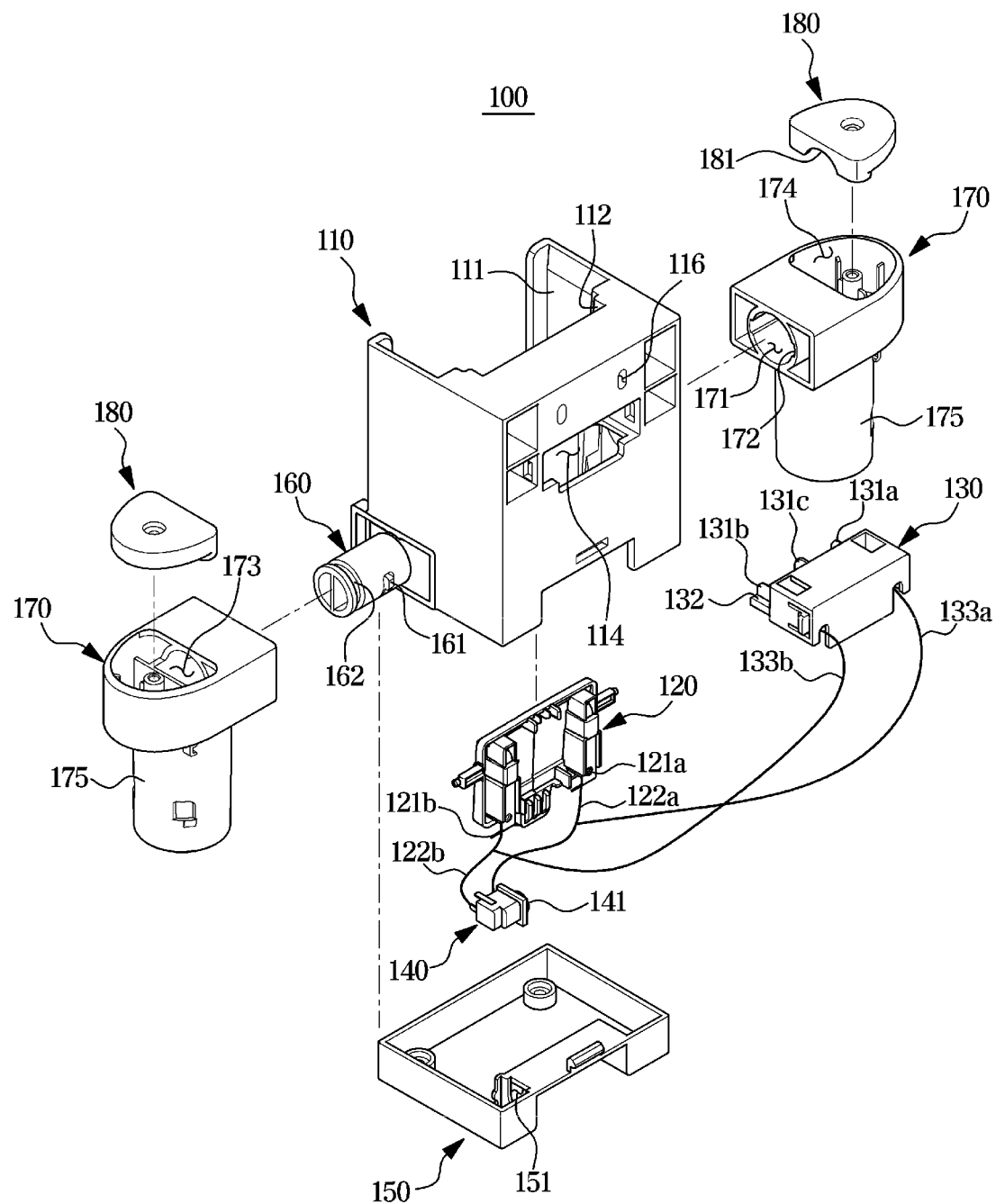
FIG. 8 is an exploded perspective view of the stand for a cleaner of FIG. 7 when viewed from another angle.

FIG. 7 is an exploded perspective view of the stand for a cleaner according to an embodiment of the disclosure. FIG. 8 is an exploded perspective view of the stand for a cleaner of FIG. 7 when viewed from another angle.

Hereinafter a structure of the stand for a cleaner according to an embodiment of the disclosure will be described in detail with reference to FIGS. 7 and 8.

Referring to FIGS. 7 and 8, the stand for a cleaner 100 may include the holding portion 110 on which the cleaner 10 or the battery 20 is seated, a first charging terminal accommodating member 120 coupled to the holding portion 110 and configured to accommodate the first charging terminal 121, a second charging terminal accommodating member 130 coupled to the holding portion 110 and configured to accommodate the second charging terminal 131, a power connection member 140 coupled to a power adapter (not shown), and a lower cover 150 configured to cover a lower surface of the holding portion 110. In addition, the stand for a cleaner 100 may include a support protrusion 160 provided on one side of the holding portion 110 so as to rotatably support the suction unit holding part 170 and the suction unit holding part 170 coupled to the support protrusion 160.

The holding portion 110 may have a concave shape to form the first seating portion 101 and the second seating portion 102. The holding portion 110 may include the battery guide 111, and the auxiliary guide 112 shorter in a vertical direction than the battery guide 111 and disposed in the inner side of the battery guide 111. In addition, the holding portion 110 may include a first insertion hole 113 to which the first charging terminal accommodating member 120 is inserted, and a second insertion hole 114 to which the second charging terminal accommodating member 130 is inserted.

The first charging terminal accommodating member 120 may accommodate the first charging terminal 121. The first charging terminal 121 may include a first positive terminal 121a and a first negative terminal 121b. The positions of the first positive terminal and the first negative terminal may be switched with respect to each other.

The second charging terminal accommodating member 130 may accommodate the second charging terminal 131. The second charging terminal 131 may include a second positive terminal 131a and a second negative terminal 131b. Between the second positive terminal 131a and the second negative terminal 131b, a positioning protrusion 131c configured to be inserted into a terminal groove (not shown) of the battery 20 may be provided. The positioning protrusion 131c is not a component that is electrically connected to the battery 20, but is a component configured to stably support the battery 20 when the battery 20 is seated on the second seating portion 102. The positions of the second positive terminal and the second negative terminal may be switched with respect to each other.

The first charging terminal 121 may be connected to a first wire 122. The first wire 122 may connect the power connection member 140 to the first charging terminal 121. Particularly, the first wire 122 may include a first positive wire 122a and a first negative wire 122b. The first positive wire 122a may connect the positive terminal (not shown) of the power connection member 140 to the first positive terminal 121a, and the first negative wire 122b may connect a negative terminal (not shown) of the power connection member 140 to the first negative terminal 121b.

The second charging terminal 131 may be connected to a second wire 133. The second wire 133 may connect the first wire 122 to the second charging terminal 131. Particularly, the second wire 133 may include a second positive wire 133a and a second negative wire 133b. The second positive wire 133a may connect the first positive wire 122a to the second positive terminal 133a, and the second negative wire 133b may connect the first negative wire 122b to the second negative terminal 133b. Therefore, the first wire 122 and the second wire 133 may be connected in parallel with the power connection member 140.

The lower cover 150 may include an accommodating portion 151 configured to accommodate the power connection member 140, and the lower cover 150 may be coupled to the lower surface of the holding portion 110 to cover the open lower surface (not shown) of the holding portion 110.

The stand for a cleaner 100 may include the support protrusion 160 protruding from opposite sides of the holding portion 110. The position of the support protrusion 160 may be provided in various ways, and according to an embodiment of the disclosure, the support protrusion 160 may be formed to protrude outwardly from opposite sides of the holding portion 110, respectively.

The support protrusion 160 may be provided in a substantially cylindrical shape. The support protrusion 160 may include an elastic protrusion 161 and a rotation guide groove 162.

The stand for a cleaner 100 may include the suction unit holding part 170 configured to hold and store the auxiliary suction unit 17. The suction unit holding part 170 may be rotatably coupled to the support protrusion 160. The suction unit holding part 170 may include an insertion groove 171 to which the support protrusion 160 is inserted, a protrusion groove 172 to which the elastic protrusion 161 is inserted, and a guide groove accommodating portion 173 in which the rotation guide groove 162 is arranged. In addition, the suction unit holding part 170 may include an open one surface 174, and the connection port 175 extending in an opposite direction of the open one surface 174. The open one surface 174 may be provided to be covered by a cover member 180.

The cover member 180 may include a rotation guide 181 inserted into the rotation guide groove 162 and the rotation guide 181 is one of components configured to rotatably couple the suction unit holding part 170 to the support protrusion 160.

The elastic protrusion 161 may be provided to be inserted into the protrusion groove 172 when the connection port 175 is arranged to face upward or downward. As the elastic protrusion 161 is inserted into the protrusion groove 172, the suction unit holding part 170 may be fixed without rotation. However, when an external force greater than the elastic force of the elastic protrusion 161 is applied, the elastic protrusion 161 may be withdrawn from the protrusion groove 172 and the suction unit holding part 170 may be rotated.

According to an embodiment of the disclosure, the suction unit holding part 170 may pivot with respect to the support protrusion 160 as a rotation center. In other words, the rotation center of the suction unit holding part 170 may be provided on the support protrusion 160. Because the support protrusion 160 is inserted into the insertion groove 171 of the suction unit holding part 170, the rotation center of the suction unit holding part 170 may be provided at a point on the suction unit holding part 170. The rotation center of the suction unit holding part 170 may be disposed under the first supporting surface 115. One point of the suction unit holding part 170, in which the rotation center is provided, may be provided on the connection port 175. Accordingly, according to an embodiment of the disclosure, the suction unit holding part 170 may be rotated relative to the holding portion 110 with respect to a point on the connection port 175 as a rotation center.

According to an embodiment of the disclosure, the suction unit holding part 170 may be located on a lateral side of the holding portion 110 regardless of the arrangement of the connection port 175. The suction unit holding part 170 may be located on the lateral side of the holding portion 110 when the connection port 175 is arranged to face upward. Further, the suction unit holding part 170 may be located on the lateral side of the holding portion 110 when the connection port 175 is arranged to face downward. According to an embodiment of the disclosure, the suction unit holding part 170 may be provided in a pair. In addition, each of the pair of suction unit holding parts 170 may be rotatably coupled to a pair of support protrusions 160 provided on opposite side walls of the holding portion 110. Each suction unit holding part 170 may be provided to be coupled to the cover member 180 provided separately from the suction unit holding part 170. In addition, the suction unit holding part 170 and the cover member 180 may be coupled to each other by a fastening member (not shown).

Figure 9:
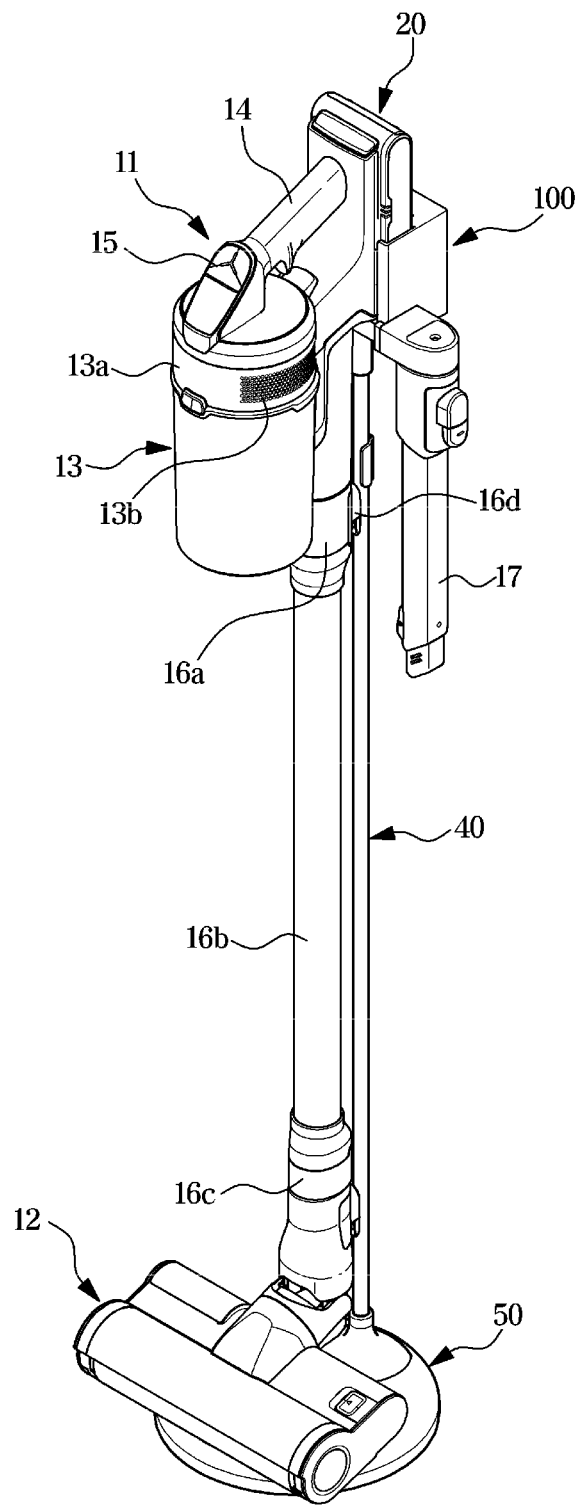
FIG. 9 is a perspective view of a cleaning apparatus according to another embodiment of the disclosure.

FIG. 9 is a perspective view of a cleaning apparatus according to another embodiment of the disclosure.

Referring to FIG. 9, a stand for a cleaner 100 according to another embodiment of the disclosure may be used as the stand type.

The stand for a cleaner 100 may be connected to a stanchion 40 and a base 50. The base 50 may include a weight balancer (not shown) provided to increase the weight of the base 50 therein. The stanchion 40 may extend in the vertical direction, and may be configured to connect the stand for a cleaner 100 to the base 50.

When the stand for a cleaner 100 is used as the stand type, the stand for a cleaner 100 may stably hold and charge a cleaner 10 without perforation work on a wall.

According to the disclosure, a user can select any one of the wall-mounted type, the battery charging type, and the stand type according to preference and use of the stand for a cleaner 100 in the selected type.

Figure 10:
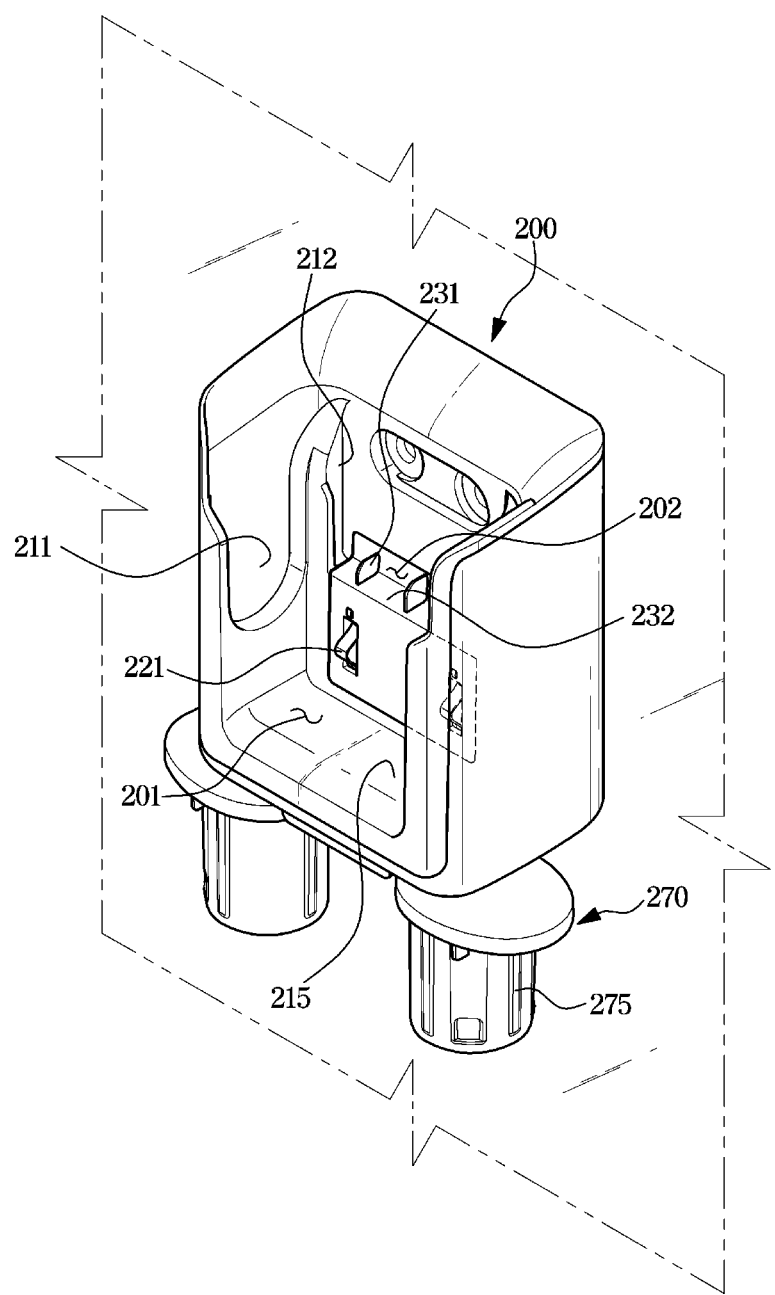
FIG. 10 is a view of a stand for a cleaner according to another embodiment of the disclosure, illustrating a state in which a connection port is arranged to face downward.
Figure 11:
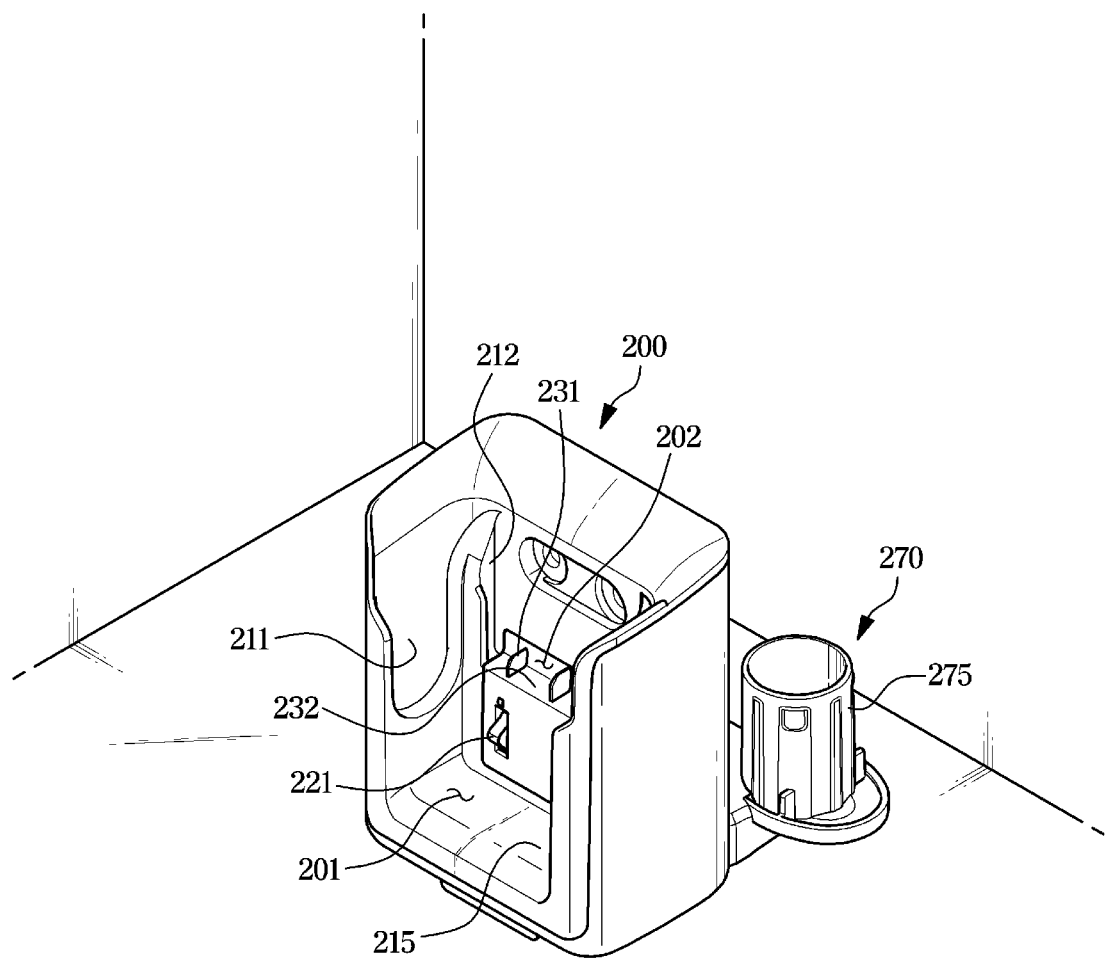
FIG. 11 is a view illustrating a state in which the connection port is arranged to face upward in the stand for a cleaner of FIG. 10.

FIG. 10 is a view of a stand for cleaner according to another embodiment of the disclosure, illustrating a state in which a connection port is arranged to face downward. FIG. 11 is a view illustrating state in which the connection port is arranged to face upward in the stand for cleaner of FIG. 10.

According to another embodiment of the disclosure, a stand for a cleaner 200 may be configured to allow the cleaner 10 (refer to FIG. 2) to be stored or held. The cleaner 10 may be charged by being held on the stand for a cleaner 200.

The stand for a cleaner 200 may include a first charging terminal 221 configured to be electrically connected to the connection terminal 19 (refer to FIG. 2) of the cleaner 10, and a first seating portion 201 on which the cleaner 10 is seated. In the first seating portion 201, the first charging terminal 221 and a first supporting surface 215 may be provided.

The stand for a cleaner 200 may include a second charging terminal 231 inserted into a terminal groove (not shown) of the battery 20 (refer to FIG. 2) so as to be electrically connected to the battery 20, and a second seating portion 202 on which the battery 20 is seated. In the second seating portion 202, the second charging terminal 231 and a second supporting surface 232 may be provided.

The first supporting surface 215 may come into contact with the cleaner 10 and support the cleaner 10 when the cleaner 10 is held on the stand for a cleaner 200. However, the disclosure is not limited thereto, and the first supporting surface 215 may not be in contact with the cleaner 10 even when the cleaner 10 is held on the stand for cleaner 200. At this time, the cleaner 10 may be supported by a battery guide 211.

The stand for a cleaner 200 may include the battery guide 211 configured to guide the battery 20. The battery guide 211 may be provided in a groove shape corresponding to a side shape of the battery 20. The battery guide 211 may be provided in a pair.

The battery guide 211 may be configured to guide the battery 20 upon seating of the cleaner 10 on the stand for cleaner 200 or upon seating of the battery 20 on the stand for a cleaner 200. The battery guide 211 may guide the battery 20 to allow the connection terminal 19 to be in contact with the first charging terminal 221 upon seating of the cleaner 10 on the stand for cleaner 200. Further, the battery guide 211 may guide the battery 20 to be electrically connected to the second charging terminal 231 upon seating of the battery 20 on the stand for cleaner 200.

The stand for a cleaner 200 may include an auxiliary guide 212 configured to guide the protrusion 23 (refer to FIG. 2) of the battery 20 when the battery 20 is seated on the second seating portion 202. The auxiliary guide 212 may be in contact with opposite sides of the protrusion 23 to guide the battery 20 to be seated on the second seating portion 202. The auxiliary guide 212 may be provided in a pair. A distance between the pair of auxiliary guides 212 may be less than a distance between the pair of battery guides 211. The second supporting surface 232 may be arranged between the pair of auxiliary guides 212.

According to another embodiment of the disclosure, the stand for a cleaner 200 may include a holding portion 210 including the above-described first seating portion 201, second seating portion 202, first charging terminal 221, second charging terminal 231, battery guide 211, auxiliary guide 212, first supporting surface 215 and second supporting surface 232.

The stand for a cleaner 200 may include a suction unit holding part 270 rotatably coupled to the holding portion 210 and configured to hold and store the auxiliary suction unit 17 (refer to FIG. 1).

Referring to FIGS. 10 and 11, the stand for a cleaner 200 may be fixed to the wall surface 30 (refer to FIG. 1) or arranged on the floor. In addition, the holding portion 210 may be connected to the stanchion 40 (refer to FIG. 9) and the base 50 (refer to FIG. 9). Because the holding portion 210 is connected to the stanchion 40 and the base 50, the stand for a cleaner 200 may be used as the stand type.

The suction unit holding part 270 may include a connection port 275 provided to be coupled to the auxiliary suction unit 17 (refer to FIG. 2). The connection port 275 may be provided in a pair. However, the disclosure is not limited thereto, and the number of connection ports may be changed.

Referring to FIG. 10, when the connection port 275 is disposed to face downward, the suction unit holding part 270 may be located below the holding portion 210. When the connection port 275 is disposed to face downward, the stand for a cleaner 200 may be used as the stand type or may be used by being coupled to the wall surface.

Referring to FIG. 11, when the connection port 275 is disposed to face upward, the suction unit holding part 270 may be located at the rear of the holding portion 210. When the connection port 275 is disposed to face upward, the stand for cleaner 200 may be arranged on the floor and used by standing thereon. At this time, the suction unit holding part 270 may be provided to prevent the holding portion 210 from falling. The suction unit holding part 270 may increase an area of contact between the stand for a cleaner 200 and the floor and thus the stand for a cleaner 200 may stably hold the battery 20.

Figure 12:
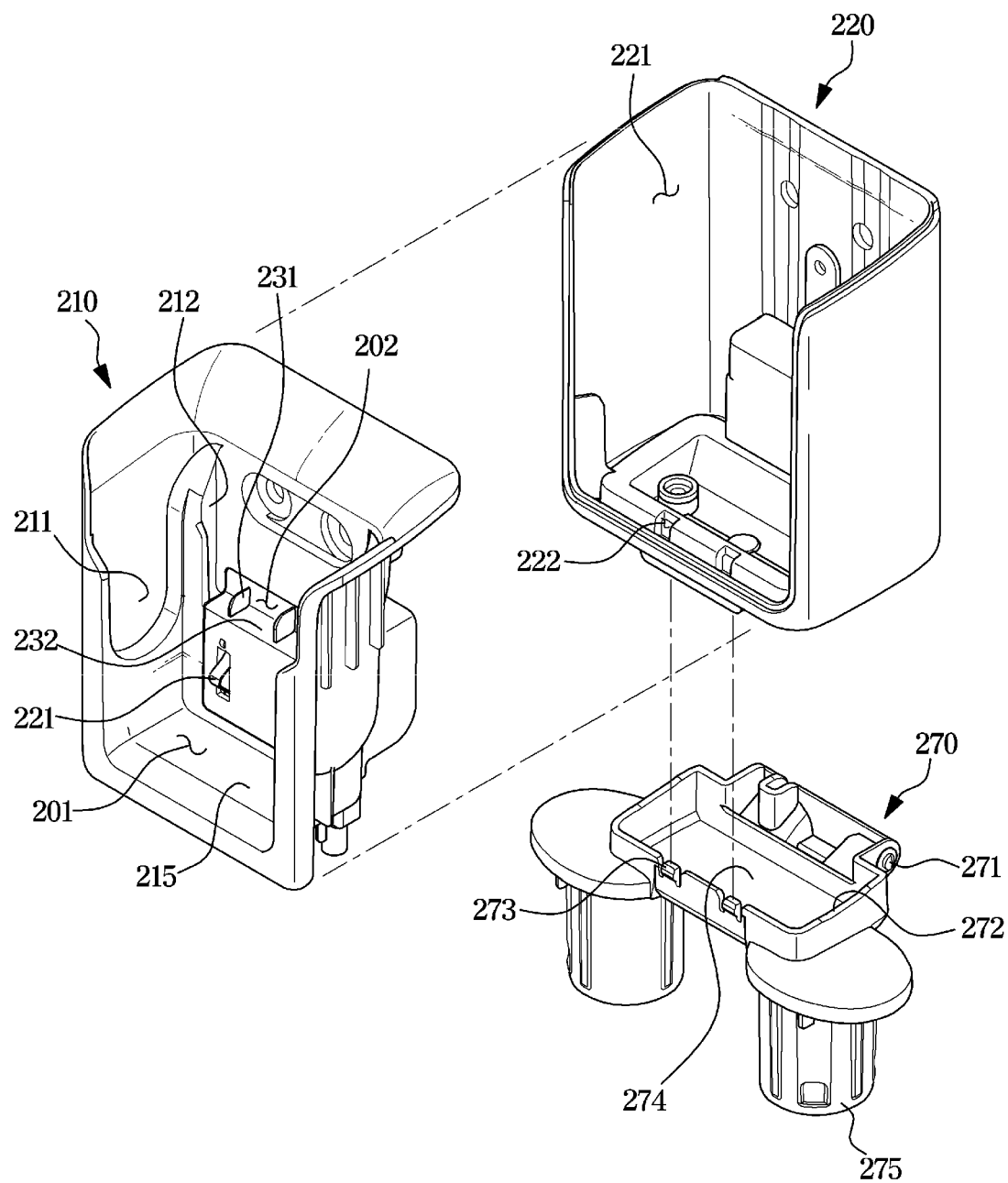
FIG. 12 is an exploded view of the stand for a cleaner of FIG. 10.

FIG. 12 is an exploded view of the stand for a cleaner of FIG. 10.

Figure 13:
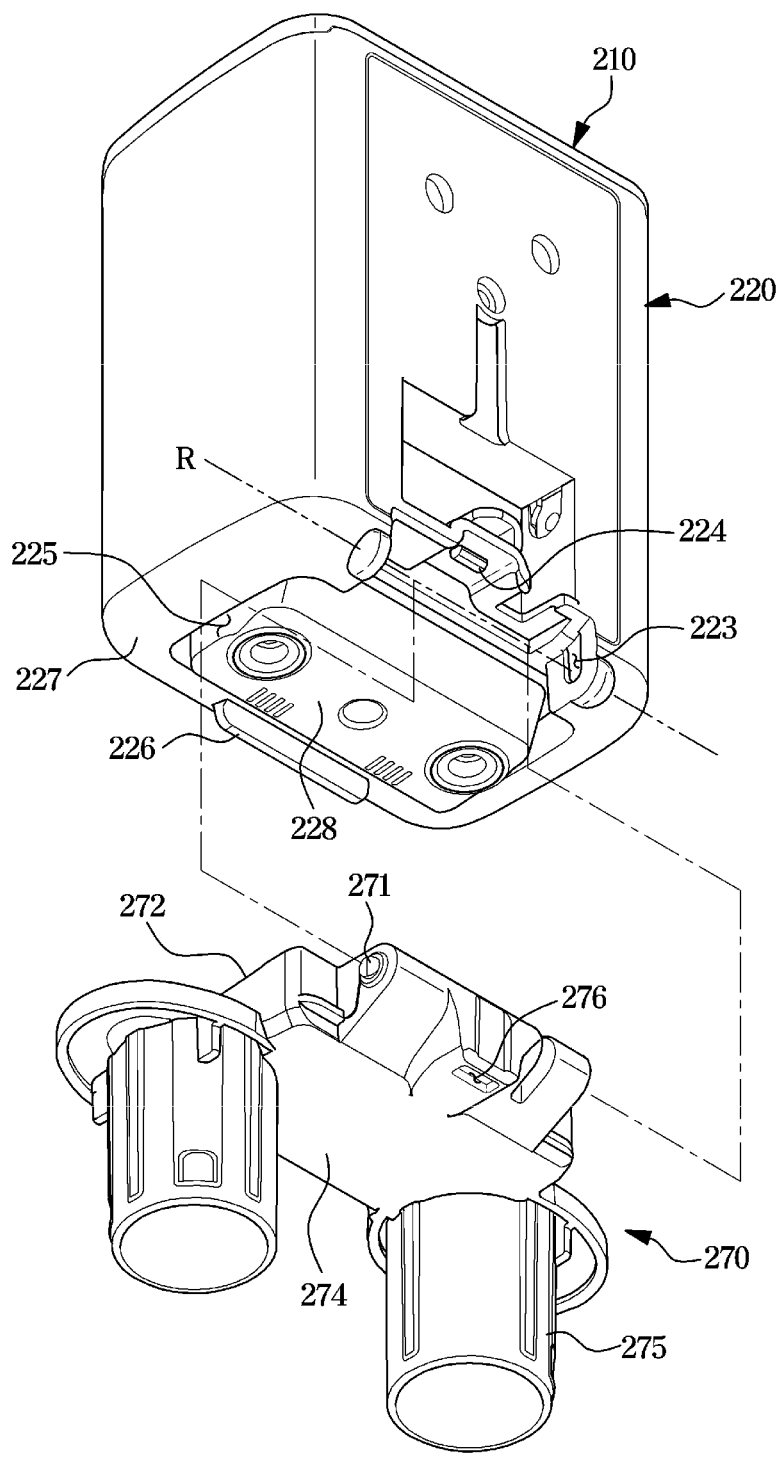
FIG. 13 is a view illustrating the stand for a cleaner of FIG. 12 when viewed from another angle.
Figure 14:
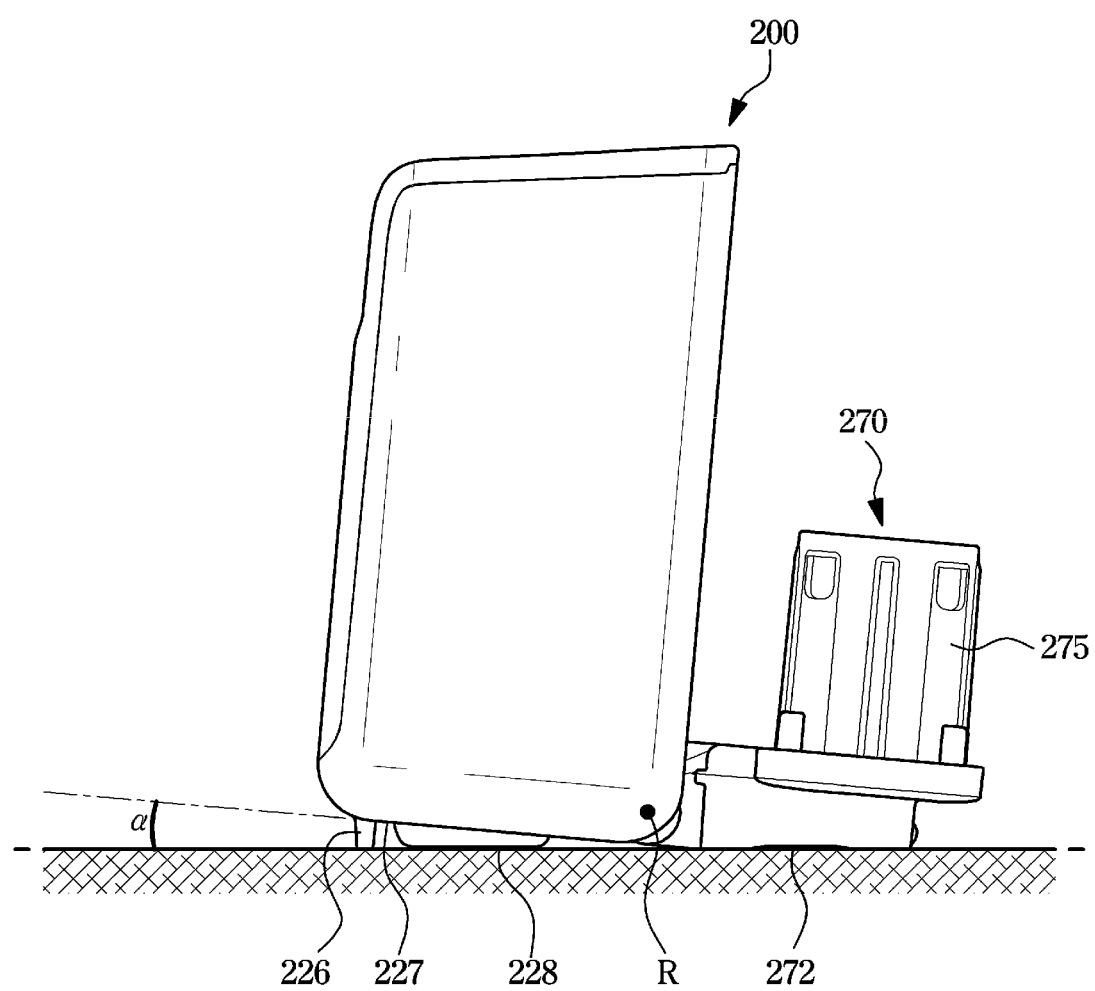
FIG. 14 is a side view of the stand for a cleaner of FIG. 11.

FIG. 13 is a view illustrating the stand for a cleaner of FIG. 12 when viewed from another angle. FIG. 14 is a side view of the stand for a cleaner of FIG. 11.

Referring to FIG. 12, the stand for a cleaner 200 according to another embodiment of the disclosure may further include a case 220 provided to be coupled to the holding portion 210. The suction unit holding part 270 may be rotatably coupled to the case 220.

The case 220 may be provided in a substantially rectangular parallelepiped shape with open upper and front surfaces based on the drawing. The holding portion 210 may be accommodated in an accommodation space 221 formed by the open front surface and upper surface of the case 220. The case 220 may be coupled to the holding portion 210 to form side and rear surfaces of the stand for a cleaner 200. The case 220 may include a fixing hole 222 to which a first fixing protrusion 273 of the suction unit holding part 270 is inserted. The fixing hole 222 may be provided to correspond to the number of the first fixing protrusions 273.

The suction unit holding part 270 may include the pair of the connection ports 275, a connection plate 274 connecting the pair of connection ports 275, a rib 272 formed by being bent from the connection plate 274, and the first fixing protrusion 273 and a rotation protrusion 271 provided on one side of the rib 272.

The rotation protrusion 271 may form a rotation center of the suction unit holding part 270. The rotation protrusion 271 may be provided in a pair. The rotation protrusion 271 may be formed at one end of the suction unit holding part 270.

The first fixing protrusion 273 may be formed at the other end of the suction unit holding part 270. The first fixing protrusion 273 may be configured to be inserted into the fixing hole 222 or withdrawn from the fixing hole 222. The first fixing protrusion 273 may be provided to be movable within a predetermined range by elastic deformation. The first fixing protrusion 273 may be provided in a pair, but the number of the first fixing protrusion 273 may be changed.

The connection port 275 may be provided to be coupled to the auxiliary suction unit 17, as described above. The connection port 275 may be provided in a pair, and the number of the connection port 275 may be changed.

The connection plate 274 may be configured to connect a plurality of connection ports 275 when the connection port 275 is provided in plural.

The rib 272 may be formed by bending an edge of the connection plate 274. The rib 272 may be provided to be inserted into a rib groove 225 to be described later or withdrawn from the rib groove 225.

Referring to FIG. 13, the case 210 may include a rotation protrusion groove 223 to which the above-described rotation protrusion 271 is inserted, a second fixing protrusion 224, the rib groove 225 to which the rib 272 is inserted, and a support 226 configured to support the case 210 when the case 210 is arranged on the floor. In addition, the case 210 may include a first lower surface 227 and a second lower surface 228.

The rotation protrusion 271 may be inserted into the rotation protrusion groove 223. When the rotation protrusion 271 is inserted into the rotation protrusion groove 223, the rotation protrusion 271 may be rotated relative to the rotation protrusion groove 223. Accordingly, the suction unit holding part 270 may be rotatably coupled to the case 220.

According to another embodiment of the disclosure, the rotation protrusion 271 may be inserted into the rotation protrusion groove 223 by elastic deformation without a separate fastening member. The rotation protrusion groove 223 may include an insertion guide portion (not shown) extending in the vertical direction, which is based on the drawing, to guide the insertion of the rotation protrusion 271. Because the suction unit holding part 270 is coupled to the case 220 without a separate fastening member, it is possible to reduce the number of components, improve the productivity of the stand for a cleaner 200 and reduce the cost of the material.

The case 220 may include the rib groove 225 to which the rib 272 is inserted. The rib groove 225 may be provided in a shape corresponding to the rib 272. When the connection port 275 is arranged to face downward, the rib 272 may be inserted into the rib groove 225. When the rib 272 is inserted into the rib groove 225, the above-described first fixing protrusion 273 may be inserted into the fixing hole 222. The first fixing protrusion 273 may be inserted into the fixing hole 222 by elastic deformation. As the first fixing protrusion 273 is inserted into the fixing hole 222, the connection port 275 may be maintained in a state of being arranged to face downward. However, when a force that is equal or greater a predetermined magnitude is applied, the first fixing protrusion 273 may be elastically deformed and withdrawn from the fixing hole 222, thereby changing the position of the suction unit holding part 270.

The case 220 may include the second fixing protrusion 224. The suction unit holding part 270 may include a fixing protrusion groove 276 to which the second fixing protrusion 224 is inserted. When the connection port 275 is arranged to face upward, the second fixing protrusion 224 may be inserted into the fixing protrusion groove 276. The second fixing protrusion 224 may be fitted to the fixing protrusion groove 276. Because the second fixing protrusion 224 is fitted to the fixing protrusion groove 276, the connection port 275 may be maintained in a state of being arranged to face upward. However, when a force that is equal or greater a predetermined magnitude is applied, the second fixing protrusion 224 may be withdrawn from the fixing protrusion groove 276, thereby changing the position of the suction unit holding part 270.

The case 220 may include the first lower surface 227 and the second lower surface 228, and when the holding portion 210 is arranged to stand thereon, the first lower surface 227 may be spaced a predetermined distance from the floor and the second lower surface 228 may be in contact with the floor.

Referring to FIG. 14, when the stand for a cleaner 200 according to another embodiment of the disclosure is disposed on the floor to allow the holding portion 210 to stand, the lower surface of the holding portion 210 may be provided at a predetermined angle with respect to the floor. In addition, a rotating shaft R of the suction unit holding part 270 may correspond to one end of the suction unit holding part 270, and may be located on the outside of the connection port 275.

When the holding portion 210 is arranged on the floor, the first lower surface 227 of the case 220 may be disposed to be inclined at a predetermined angle α with respect to the floor. At this time, the first lower surface 227 of the case 220 may be arranged in such a way that a front end of the first lower surface 227 is spaced apart from the floor by a first distance and a rear end of the first lower surface 227 is spaced apart from the floor by a second distance less than the first distance. The rear end of the first lower surface 227 may come into contact with the floor. The predetermined angle α may be set to 30° or less.

The case 220 may include the support 226 provided at the front end of the first lower surface 227 of the case 220. The support 226 may come into contact with the floor to separate the first lower surface 227 of the stand for a cleaner 200 from the floor by the predetermined distance.

The case 220 may further include the second lower surface 228 provided to be in contact with the floor when the holding portion 210 is arranged on the floor. The second lower surface 228 may protrude downward than the first lower surface 227. The second lower surface 228 may be provided to be inclined at a predetermined angle α with respect to the first lower surface 227.

As described above, according to another embodiment of the disclosure, the holding portion 210 may be provided to be inclined at a predetermined angle with respect to the floor. By this arrangement, it is possible to prevent the holding portion 210 from falling. The stand for cleaner 200 may hold and charge the battery 20 more stably.

When the suction unit holding part 270 is disposed at the rear of the holding portion 210 to place the connection port 275 facing up, the rib 272 may come into contact with the floor. Because the rib 272 is in contact with the floor, an area of contact between the stand for a cleaner 200 and the floor may be increased. Accordingly, the stand for a cleaner 200 may stand on the floor more stably. Further, without failing, the stand for a cleaner 200 may stably hold the battery 20 and the auxiliary suction unit 17.

According to another embodiment of the disclosure, the rotating shaft R corresponding to the rotation center of the suction unit holding part 270 may be located on the outside of the connection port 275. The rotating shaft R may be disposed adjacent to the rear end and the lower end of the holding portion 210. In addition, the rotating shaft R may be provided at one end of the suction unit holding part 270. Because the rotation protrusion 271 forms the rotating shaft R, the rotation protrusion 271 and the rotating shaft R may be provided at the same position.

As described above, because the rotating shaft R is located on the outside the of connection port 275, the position of the connection port 275 may be changed according to the rotation of the suction unit holding part 270. According to an embodiment of the disclosure, when the suction unit holding part 170 is rotated, the connection port 175 may be rotated while maintaining its position, but according to another embodiment of the disclosure, when the suction unit holding part 270 is rotated, the connection port 275 may be not only rotated but also change its position. For the example, when the suction unit holding part 270 is rotated, the connection port 275 may be moved from the rear side of the holding portion 210 to the lower side of the holding portion 210, or alternatively, the connection port 275 may be moved from the lower side of the holding portion 210 to the rear side of the holding portion 210.

Figure 15:
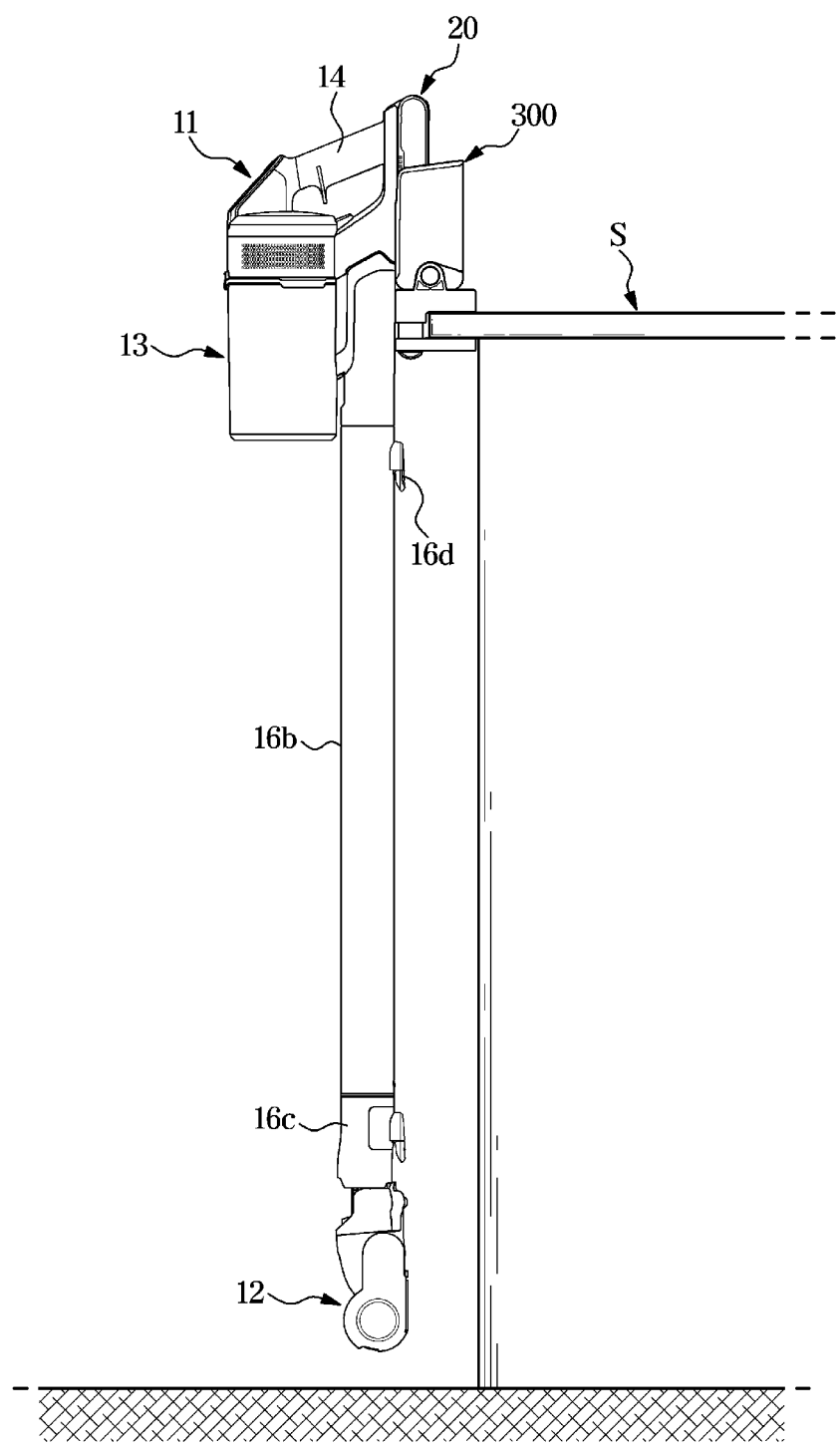
FIG. 15 is a perspective view of a cleaning apparatus according to still another embodiment of the disclosure.
Figure 16:
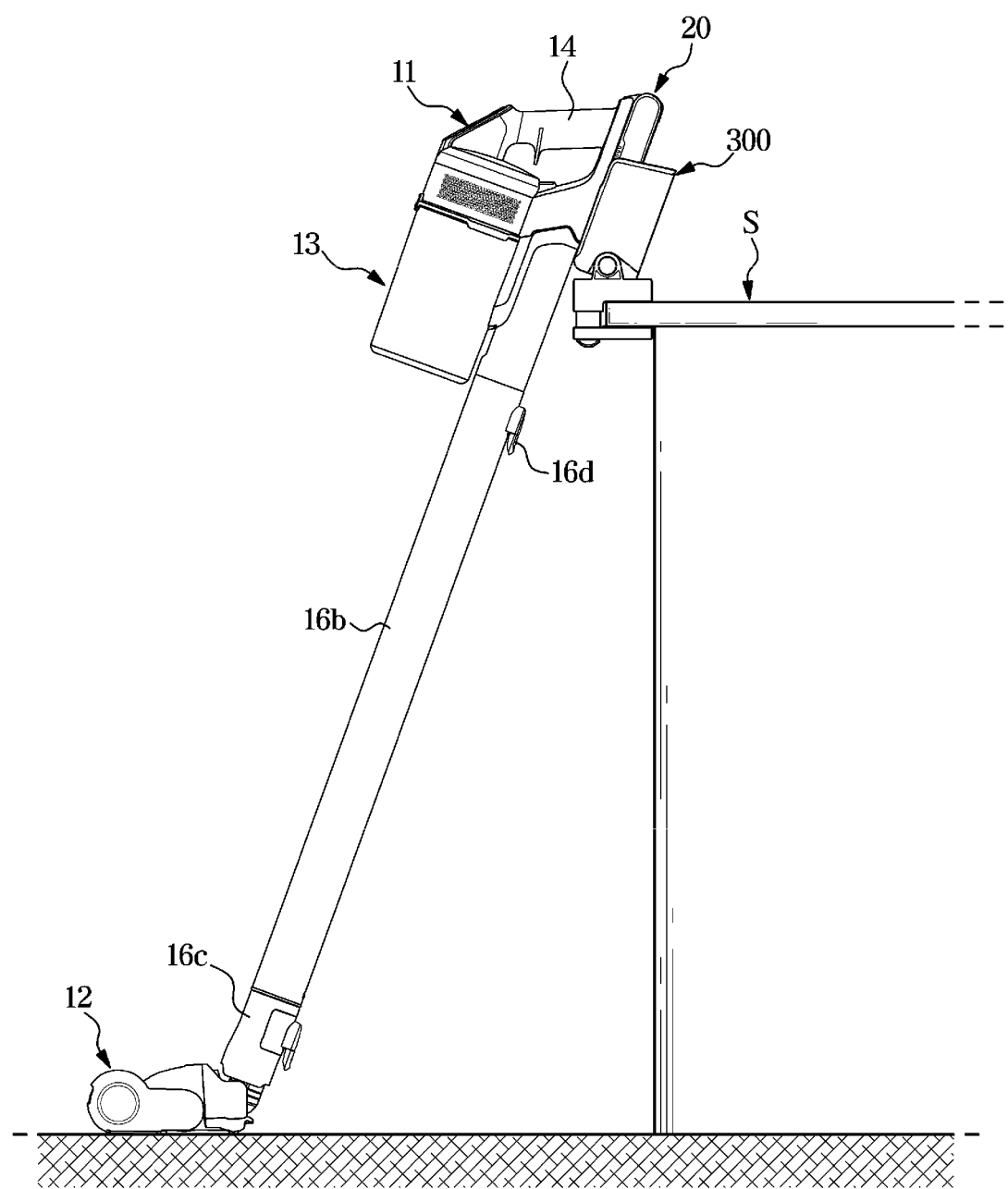
FIG. 16 is a perspective view of the cleaning apparatus of FIG. 15, illustrating a state in which the cleaner is mounted at an angle.

FIG. 15 is a perspective view of a cleaning apparatus according to still another embodiment of the disclosure. FIG. 16 is a perspective view of the cleaning apparatus of FIG. 15, illustrating a state in which the cleaner is mounted at an angle.

Hereinafter a cleaning apparatus according to still another embodiment of the disclosure will be described with reference to FIGS. 15 and 16.

According to still another embodiment of the disclosure, a stand for a cleaner 300 may be used in a type different from the above-described embodiment. The stand for a cleaner 300 may be used as a fixed type rather than the wall-mounted type, the battery charging type, or the stand type. The fixed type, as shown in FIGS. 15 and 16, may refer to a method in which the stand for a cleaner 300 is fixed to an edge of a desk, a table, a shelf, or the like without a perforation on a wall or a stand.

The stand for a cleaner 300 may be used as the fixed type. The stand for a cleaner 300 may be installed in a structure protruding in a direction parallel to the ground. The stand for a cleaner 300 may be installed in a structure that protrudes in the direction parallel to the ground, and has a thickness within a movable range of a fixer 320 to be described later. For example, the stand for a cleaner 300 may be installed at an edge of a desk, a table, a shelf, or the like. Hereinafter a structure in which the stand for a cleaner 300 is installed is referred to as a supporting portion S.

According to still another embodiment of the disclosure, the stand for a cleaner 300 may be easily installed or removed without a separate fastening tool. In addition, the stand for a cleaner 300 may have a simple configuration, and thus the cost of the material may be reduced. In addition, the stand for a cleaner 300 may be installed without limitation in the height of the supporting portion S.

Referring to FIG. 15, the stand for a cleaner 300 may be installed at the supporting portion S having a sufficiently high position to allow the cleaner 10 to be vertically arranged. The sufficiently high position may represent a position in which, even when the cleaner body 11, to which the extension tube 16b and the main suction unit 12 are coupled, is held on the stand for cleaner 300, the extension tube 16b is maintained in a state of being vertically arranged. In other words, the sufficiently high position may represent a position in which a distance between a holding portion 310 of the stand for a cleaner 300 and the ground is greater than the length of the cleaner 10.

When the stand for a cleaner 300 is installed to be fixed to the supporting portion S at the sufficiently high position, the cleaner 10 may be vertically arranged. This is because the main suction unit 12 or the extension tube 16*b* does not interfere with the ground even when the cleaner 10 is vertically arranged.

Referring to FIG. 16, the stand for a cleaner 300 may be installed in the supporting portion S at a low position to arrange the cleaner 10 at an angle. The low position may represent a position in which even when the cleaner body 11, to which the extension tube 16*b* and the main suction unit 12 are coupled, is held on the stand for cleaner 300, the extension tube 16*b* is arranged at an angle. In other words, the low position may represent a position in which a distance between the holding portion 310 of the stand for a cleaner 300 and the ground is less than the length of the cleaner 10.

When the stand for a cleaner 300 is installed to be fixed to the supporting portion S at the low position, the cleaner 10 may be arranged at an angle. This is because when the cleaner 10 is vertically arranged, the main suction unit 12 and the extension tube 16*b* interfere with the ground.

As described above, according to still another embodiment of the disclosure, the stand for a cleaner 300 may be installed in the supporting portion S (refer to FIG. 16) at the low position as well as the supporting portion S (refer to FIG. 15) at the sufficiently high position. That is, the stand for a cleaner 300 may be installed without limitation in the height of the supporting portion S. Therefore, the utilization of the stand for a cleaner 300 may be improved.

Figure 17:
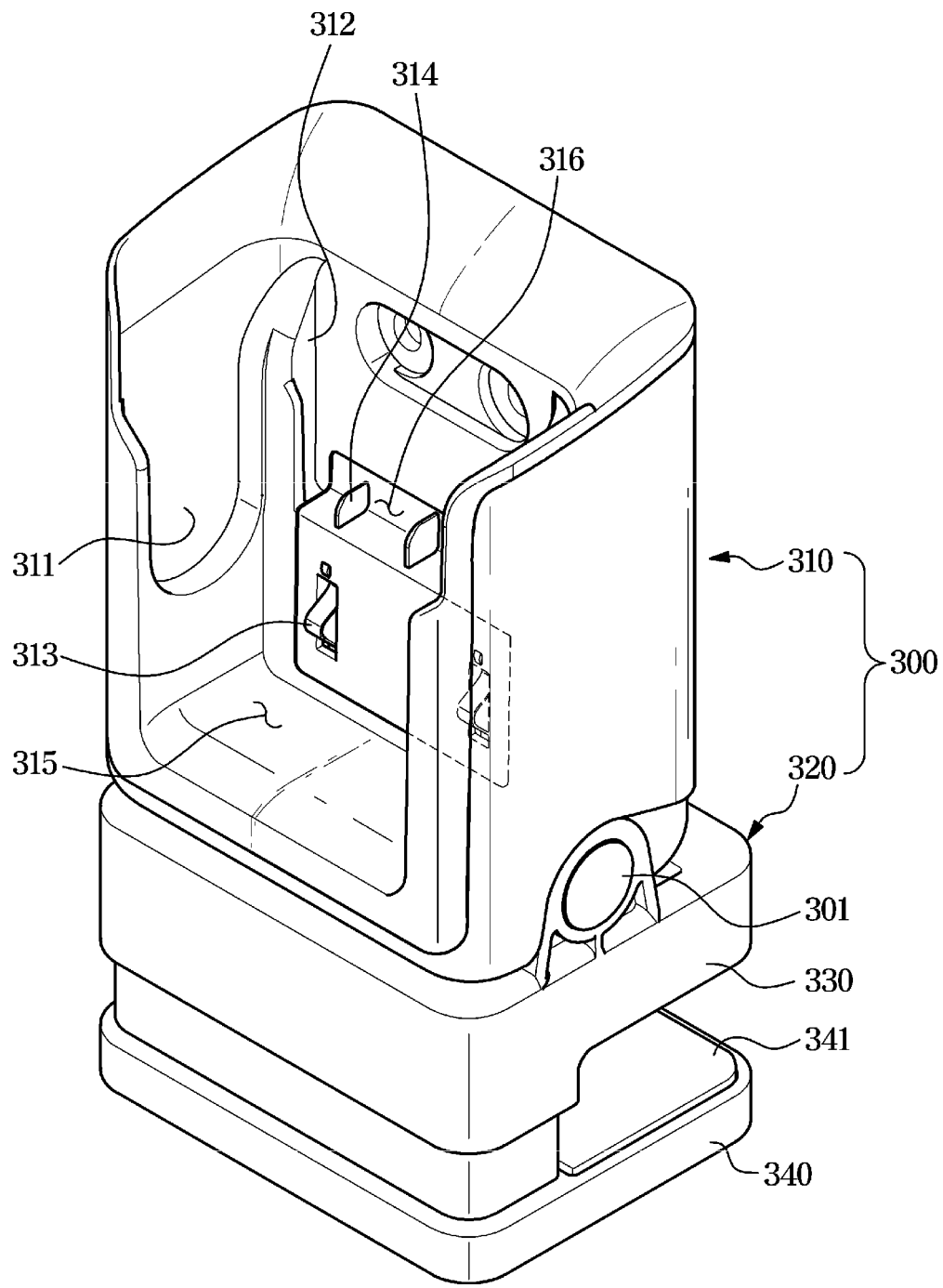
FIG. 17 is a view of the stand for a cleaner separated from the cleaning apparatus of FIG. 15.

FIG. 17 is a view of the stand for a cleaner separated from the cleaning apparatus of FIG. 15.

Referring to FIG. 17, the stand for a cleaner 300 according to still another embodiment of the disclosure may include the holding portion 310 and a fixer 320. The holding portion 310 may be provided in substantially the same structure as the holding portion 110 and 210 described above. The holding portion 310 may include a battery guide 311 and an auxiliary guide 312. In addition, the holding portion 310 may include a first charging terminal 313 and a second charging terminal 314. In addition, the holding portion 310 may include a first seating portion 315 and a second seating portion 316.

The battery guide 311 and the auxiliary guide 312 may have the same structure and function as the battery guides 111 and 211 and the auxiliary guides 112 and 212, respectively. In addition, the first charging terminal 313 and the second charging terminal 314 may have the same structure and function as the first charging terminals 121 and 221 and the second charging terminals 131 and 231, respectively. In addition, the first seating portion 315 and the second seating portion 316 may have the same structure and function as the first seating portions 101 and 201 and the second seating portions 102 and 202, respectively.

Figure 19:
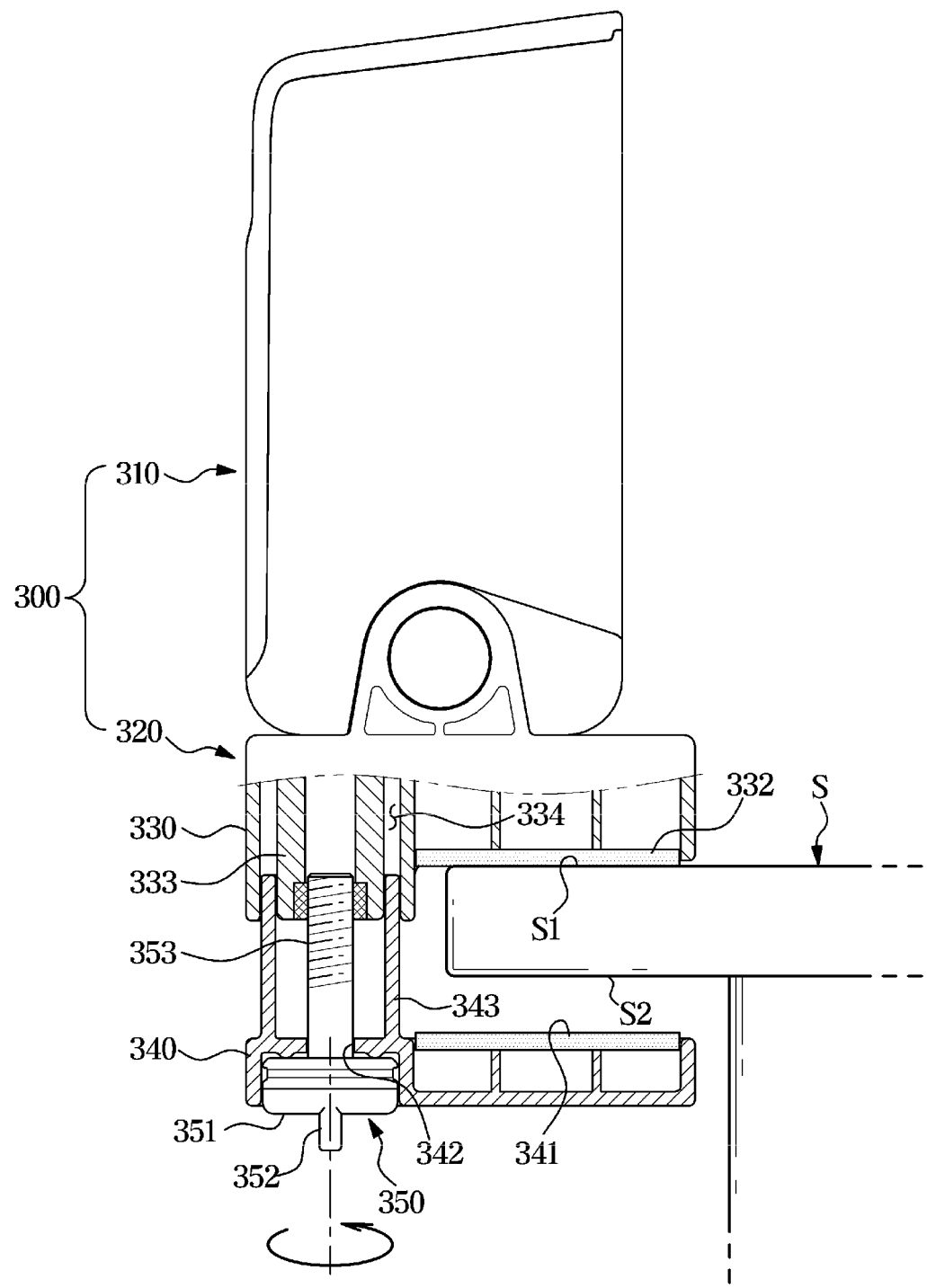
FIG. 19 is a view of the stand for a cleaner separated from the cleaning apparatus of FIG. 15, illustrating before the stand for a cleaner is fixed to a supporting portion.

According to still another embodiment of the disclosure, the stand for a cleaner 300 may include the fixer 320. The fixer 320 may be coupled under the holding portion 310. The fixer 320 may be rotatable with respect to the holding portion 310. The fixer 320 may be provided to grasp the supporting portion S (FIG. 19). The stand for a cleaner 300 may be installed on the supporting portion S because the fixer 320 grasps the supporting portion S.

The holding portion 310 may be configured to be rotatable with respect to the fixer 320. The stand for a cleaner 300 may be installed without limitation in the height of the supporting portion S because the holding portion 310 is rotated with respect to the fixer 320. This is because when the stand for a cleaner 300 is coupled to the supporting portion S at the low position, the holding portion 310 may be rotated and thus the cleaner 10 may be arranged at an angle.

Figure 18:
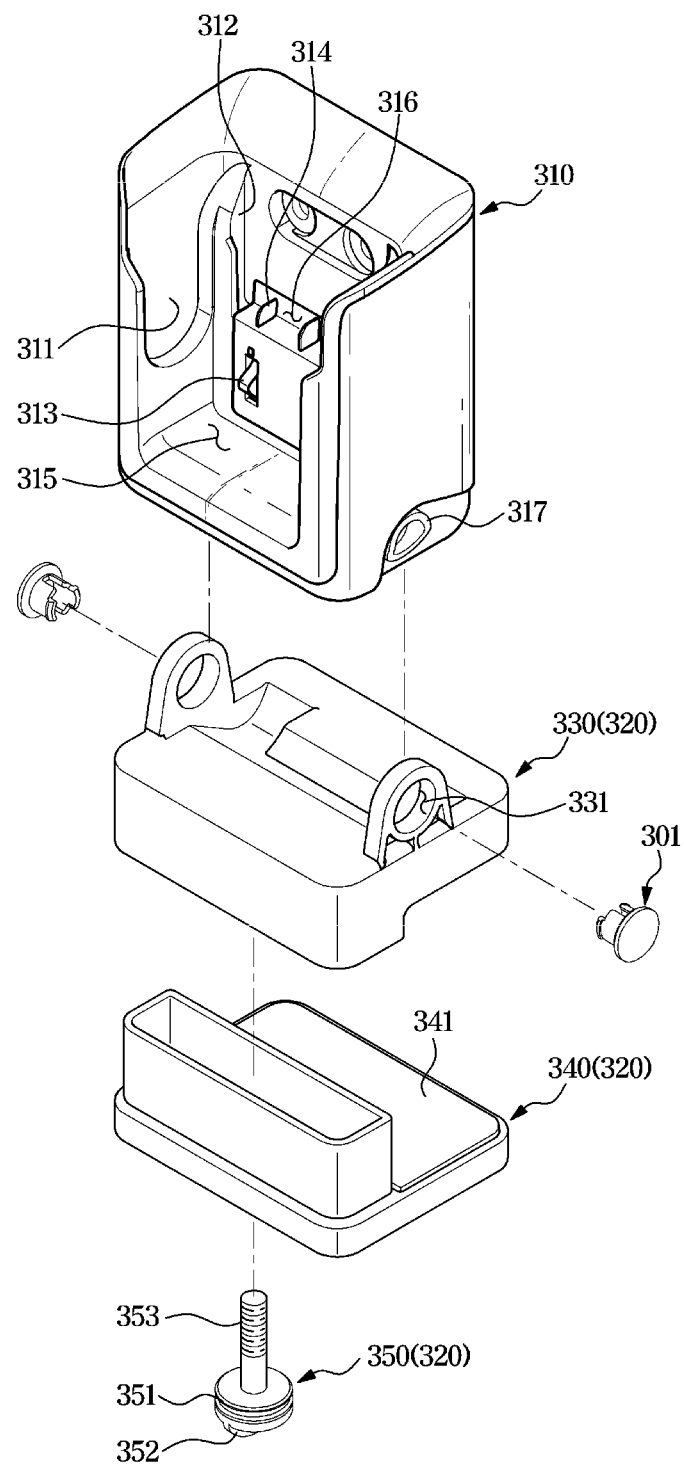
FIG. 18 is an exploded perspective view of the stand for a cleaner of FIG. 17.

FIG. 18 is an exploded perspective view of the stand for cleaner of FIG. 17.

Hereinafter a detailed configuration of the stand for cleaner 300 will be described in detail with reference to FIG. 18.

The stand for a cleaner 300 may include the holding portion 310 and the fixer 320. Because the holding portion 310 has substantially the same structure as the above-described holding portions 110 and 210, a description thereof will be omitted.

The fixer 320 may include an upper holder 330 and a lower holder 340. In addition, the fixer 320 may further include a lever 350 configured to adjust a distance between the upper holder 330 and the lower holder 340.

The upper holder 330 may be rotatably coupled to the holding portion 310. The upper holder 330 may be rotatably coupled to the holding portion 310 in various ways. For example, as shown in FIG. 18, a shaft portion 317 may be provided at a lower end of opposite sides of the holding portion 310, and the upper holder 330 may include a shaft hole 331 into which the shaft portion 317 is inserted. As the shaft portion 317 is inserted into the shaft hole 331, the holding portion 310 may be rotatably coupled to the upper holder 330. Alternatively, a shaft hole may be provided at a lower end of opposite sides of the holding portion 310, and a shaft portion may be provided on the upper holder 330.

The stand for a cleaner 300 may further include a cover 301 configured to prevent the shaft portion 317 inserted into the shaft hole 331 from being exposed to the outside of the stand for cleaner 300. The cover 301 may improve the aesthetic aspect of the stand for cleaner 300.

The upper holder 330 may include an upper pad 332 provided to be in contact with an upper surface S1 of the supporting portion S. The upper pad 332 may increase friction between the upper holder 330 and the upper surface S1 of the supporting portion S. The upper pad 332 may increase the frictional force with the supporting portion S so as to allow the fixer 320 to be coupled to the supporting portion S more stably.

The upper holder 330 may include a lever engaging portion 333 to which the lever 350 is coupled. The lever 350 may be inserted into the lever engaging portion 333. The lever engaging portion 333 may include a female threaded portion to be screwed with the lever 350. Although not specifically shown in the drawings, the female threaded portion may be formed on an inner side of the lever engaging portion 333.

The upper holder 330 may further include a boss engaging portion 334 into which a boss portion 343 of the lower holder 340 is inserted. The boss portion 343 may be inserted into the boss engaging portion 334.

The lower holder 340 may be coupled to the upper holder 330. The lower holder 340 may be provided to be movable relative to the upper holder 330. The lower holder 340 may be provided to be movable upward or downward with respect to the upper holder 330. Accordingly, the distance between the upper holder 330 and the lower holder 340 may be changed.

The lower holder 340 may include a lower pad 341 provided to be in contact the lower surface S2 of the supporting portion S. The lower pad 341 may increase the friction between the lower holder 340 and the lower surface S2 of the supporting portion S. The lower pad 341 increases the frictional force with the supporting portion S to allow the fixer 320 to be coupled to the supporting portion S more stably.

The lower holder 340 may include a lever hole 342 through which the lever 350 passes. The lever 350 may be inserted into the lever hole 342. The lever 350 may pass through the lever hole 342 and be coupled to the lever engaging portion 333 described above.

The lower holder 340 may further include the boss portion 343 provided to be inserted into the boss engaging portion 334 of the upper holder 330.

The boss portion 343 may be formed to protrude upward from the lower holder 340. The boss portion 343 may be inserted into the boss engaging portion 334 to allow the lower holder 340 and the upper holder 330 to be stably coupled to each other. In addition, the boss portion 343 may guide a vertical movement of the lower holder 340 with respect to the upper holder 330.

The lever 350 may be coupled to the upper holder 330 and the lower holder 340. The lever 350 may be configured to move a position of the lower holder 340. As the lever 350 is rotated, a distance between the lower holder 340 and the upper holder 330 may be changed. Particularly, the distance between the lower holder 340 and the upper holder 330 may be reduced or increased depending on the rotation direction of the lever 350.

The lever 350 may include a head 351 configured to allow a user to rotate the lever 350. The head 351 may include a protrusion 352 to allow a user to easily grip the head 351.

The lever 350 may include a body 353 provided to be screwed with the lever engaging portion 333. The body 353 may include a male threaded portion. In other words, a thread may be formed on an outer side of the body 353. The body 353 may be screwed with the female threaded portion of the lever engaging portion 333. The body 353 may penetrate the lever hole 342. A diameter of the lever hole 342 may be greater than an outer diameter of the body 353.

The lever 350 may be coupled to the lower holder 340 and the upper holder 330 from the lower side of the lower holder 340. The body 353 may be screwed with the female threaded portion of the lever engaging portion 333 through the lever hole 342 of the lower holder 340. An outer diameter of the head 351 may be greater than the diameter of the lever hole 342. Therefore, the head 351 may not penetrate the lever hole 342. The body 353 may be coupled to the lever engaging portion 333, and the head 351 may be located on the outside of the lower holder 340.

FIG. 19 is a view of the stand for a cleaner separated from the cleaning apparatus of FIG. 15, illustrating before the stand for a cleaner is fixed to a supporting portion.

Referring to FIG. 19, the stand for a cleaner 300 may be coupled to a supporting portion S having a thickness less than a distance at which the upper holder 330 and the lower holder 340 are farthest away from each other.

The upper holder 330 may be disposed to be in contact with the upper surface S1 of the supporting portion S. Particularly, the upper pad 332 may be in contact with the upper surface S1 of the supporting portion S.

The supporting portion S may be positioned between the lower holder 340 and the upper holder 330. At this time, because the lower holder 340 is not in contact with the supporting portion S, the fixer 320 is not fixed to the supporting portion S. Because the distance between the lower holder 340 and the upper holder 330 is greater than the thickness of the supporting portion S, the fixer 320 may be freely separated from the supporting portion S, and conversely, the supporting portion S may be located between the upper holder 330 and the lower holder 340.

Figure 20:
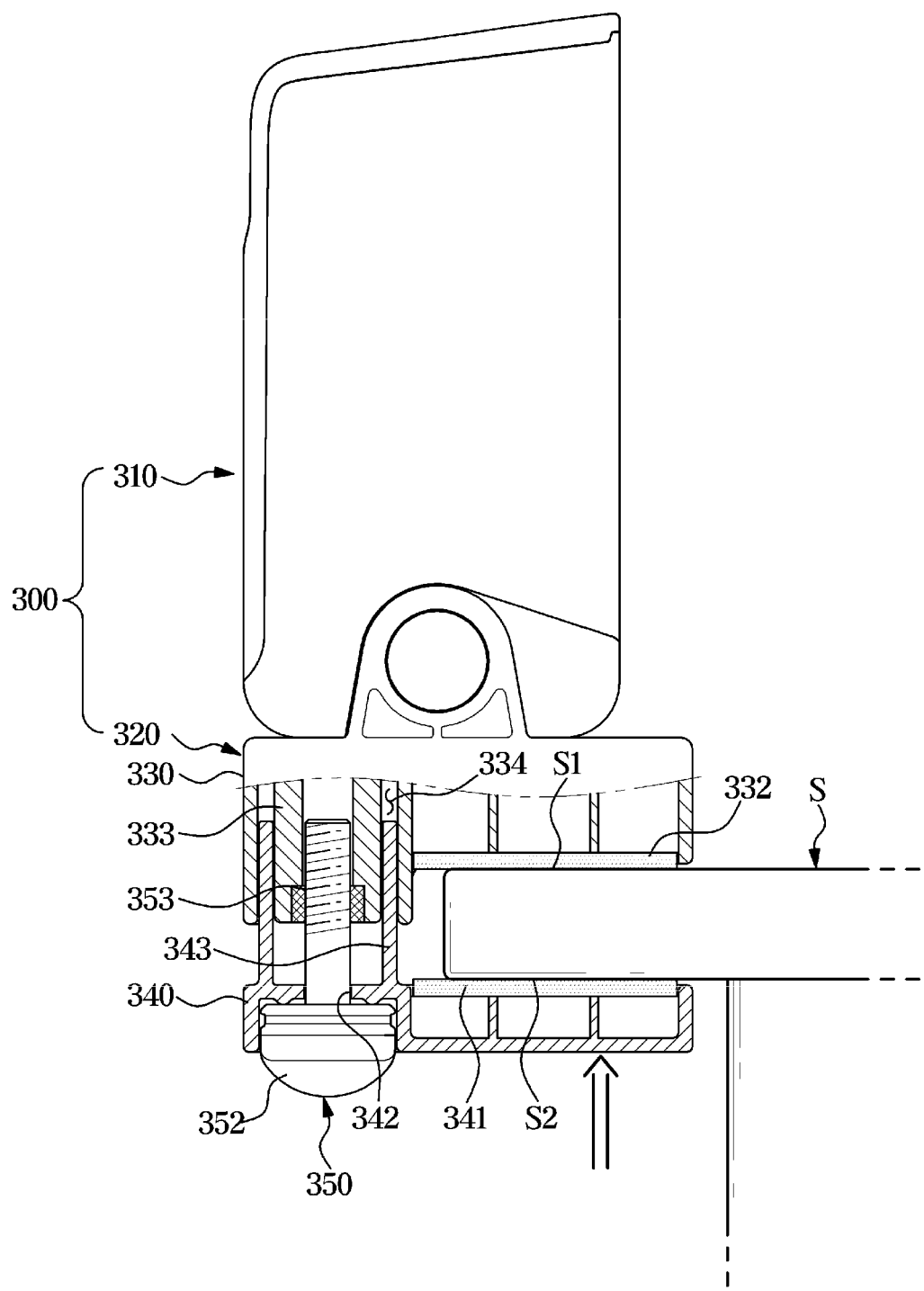
FIG. 20 is a view of the stand for a cleaner separated from the cleaning apparatus of FIG. 15, illustrating after the stand for cleaner is fixed to the supporting portion.

FIG. 20 is a view of the stand for a cleaner separated from the cleaning apparatus of FIG. 15, illustrating after the stand for a cleaner is fixed to the supporting portion.

The stand for a cleaner 300 may be installed on the supporting portion S by rotating the lever 350. By rotating the lever 350 after placing the supporting portion S between the upper holder 330 and the lower holder 340, it is possible to move the lower holder 340. By rotating the lever 350 to a direction in which the lower holder 340 is moved upward and a distance with the upper holder 330 is reduced, the fixer 320 may be installed on the supporting portion S. The lower holder 340 may be moved upward and thus the lower pad 341 may come into contact with the lower surface S2 of the supporting portion S. When the upper pad 332 is in close contact with the upper surface S1 of the supporting portion S, and the lower pad 341 is in close contact with the lower surface S2 of the supporting portion S, the fixer 320 may be fixed to the supporting portion S. When the fixer 320 is fixed to the supporting portion S, it is possible to stably maintain the state in which the cleaner 10 is coupled to the holding portion 310.

On the other hand, the fixer may be provided with a structure that is different from the structure shown in FIGS. 15 to 20. For example, the fixer may include an upper holder, a lower holder, and an elastic member. As described above, the lower holder may be configured to be movable relative to the upper holder. The elastic member may provide an elastic force to allow the lower holder to move in a direction closer to the upper holder. A user can separate the lower holder from the upper holder by applying a force greater than the elastic force, and place the supporting portion between the upper holder and the lower holder. When the user removes the force after placing the supporting portion between the upper holder and the lower holder, the fixer may be maintained in a state of being fixed to the support by the elastic force of the elastic member. Further, the supporting portion may be maintained in a state of being arranged between the upper holder and the lower holder. As described above, although not specifically illustrated in the drawings, the fixer may be provided in various structures. The fixer may be fixed to an edge of a desk, a table, or a shelf and the fixer may be configured to be rotatable with respect to the holding portion.

Figure 21:
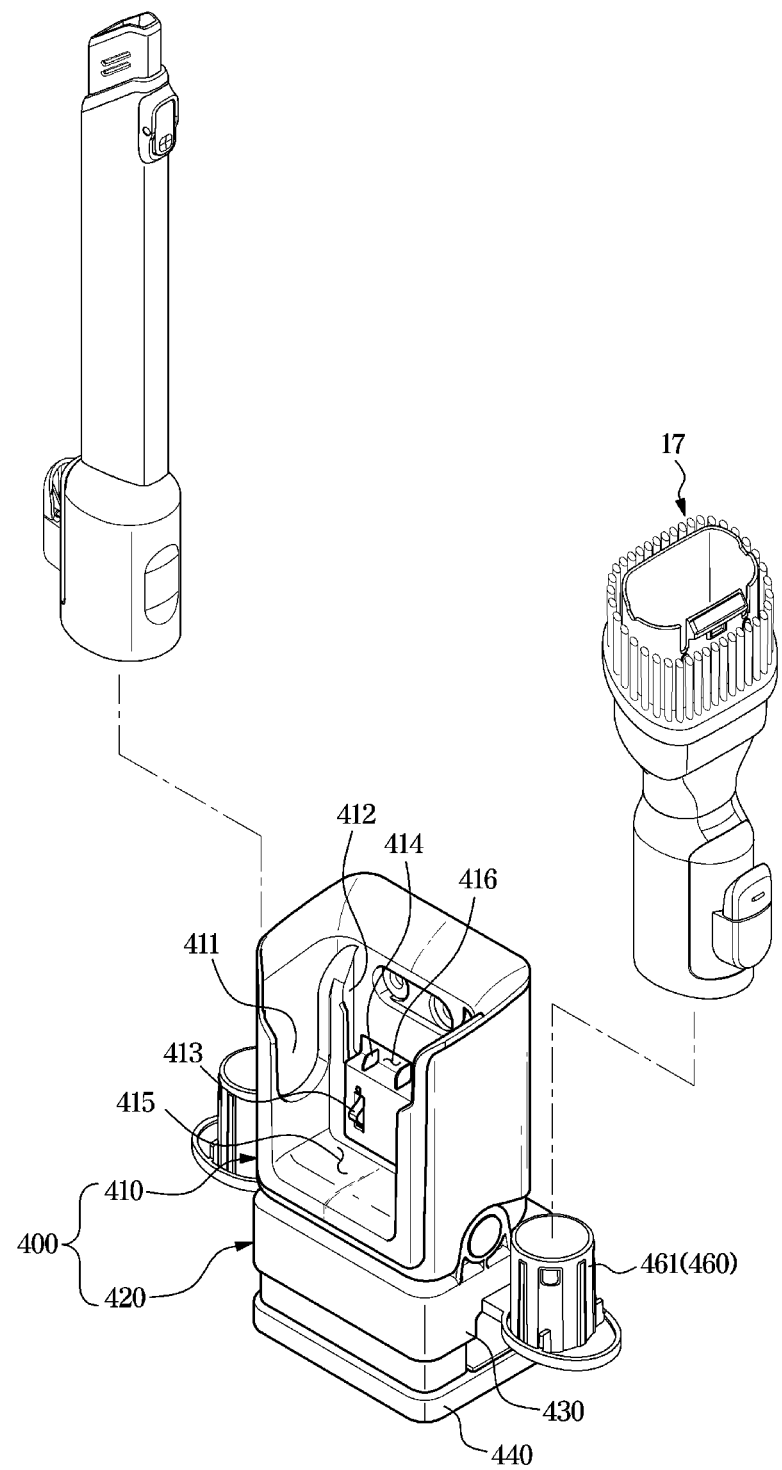
FIG. 21 is a view of a stand for a cleaner according to still another embodiment of the disclosure.

FIG. 21 is a view of a stand for a cleaner according to still another embodiment of the disclosure. Hereinafter a stand for cleaner 400 according to still another embodiment of the disclosure will be described with reference to FIG. 21.

According to still another embodiment of the disclosure, the stand for a cleaner 400 may include a holding portion 410 and a fixer 420. Because the holding portion 410 may have the same structure and function as the holding portion 310 described above, a description thereof will be omitted. Basically, the fixer 420 may have the same structure as the fixer 320 described above. However, the fixer 420 may further include a suction unit holding part 460.

The suction unit holding part 460 may be provided in an upper holder 430 of the fixer 420. The suction unit holding part 460 may include a connection port 461 configured to be coupled to the auxiliary suction unit 17 (refer to FIG. 2). The connection port 461 may be provided in a pair. However, the disclosure is not limited to this, and the number of the connection ports may be changed.

According to still another embodiment of the disclosure, the connection port 461 may be provided in a pair. The pair of connection ports 461 may be provided in the upper holder 430. The pair of connection ports 461 may be respectively disposed on opposite sides of the holding portion 410. Even when the holding portion 410 is rotated relative to the fixer 420, interference with the connection port 461 may not occur because the connection port 461 is disposed on the lateral side of the holding portion 410.

By holding the cleaner 10 on the holding portion 410 by the above-described structure, not only the cleaner 10 may be charged, but also the auxiliary suction unit 17 may be held on the fixer 420. Because a position for storing the auxiliary suction unit 17 is not required, space utilization may be improved. In addition, because the suction unit holding part 460 is provided adjacent to the holding portion 410 configured to charge and hold the cleaner 10, usability may be improved.

As is apparent from the above description, the stand for a cleaner may include the first charging terminal for charging the cleaner body and the second charging terminal for charging the battery, thereby selectively charging the cleaner body and the battery.

Because the stand for a cleaner includes the suction unit holding part configured to be rotatable on the holding portion, the holding portion may be used in various ways by changing the direction of the suction unit holding part.

It is possible to reduce the production cost of the stand for a cleaner, and also to improve productivity by reducing the number of components.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A stand configured to hold a cleaner having a cleaner body configured to receive a battery, comprising:
   a first charging terminal configured to be electrically connected to the cleaner body when the cleaner body is held by the stand;
   a second charging terminal configured to be electrically connected to the battery when the battery is separated from the cleaner body and held by the stand; and
   a battery guide configured to guide the battery when attached to the cleaner body to guide the cleaner body to be connected to the first charging terminal and configured to guide the battery to be connected to the second charging terminal when the battery is separated from the cleaner body.

2. The stand of claim 1, wherein
   the battery is arranged to face in a first direction with respect to the stand when the battery is attached to the cleaner body and the cleaner body is electrically connected to the first charging terminal.

3. The stand of claim 2, wherein
   the battery is arranged to face in a second direction opposite to the first direction with respect to the stand when the battery is separated from the cleaner body and the battery is electrically connected to the second charging terminal.

4. The stand of claim 3, wherein
   the battery guide is configured to guide the battery when the battery is to be arranged in the first direction or the second direction.

5. The stand of claim 1, further comprising:
   a first seating portion on which the cleaner body is to be seated to be electrically connected to the first charging terminal; and
   a second seating portion on which the battery is to be seated to be electrically connected to the second charging terminal.

6. The stand of claim 5, wherein
   a lower end of the battery guide is configured to come into contact with the battery when the cleaner body is seated on the first seating portion, and
   the lower end of the battery guide is configured to be spaced a predetermined distance from the battery when the battery is seated on the second seating portion.

7. The stand of claim 5, wherein
   the second seating portion is configured to be located in an upper side of the first seating portion.

8. The stand of claim 1, further comprising:
   an auxiliary guide configured to guide the battery to be connected to the second charging terminal when the battery is separated from the cleaner body,
   wherein the auxiliary guide is disposed at a rear side of the battery guide, and
   wherein a length of the auxiliary guide in a vertical direction is less than a length of the battery guide in the vertical direction.

9. The stand of claim 8, wherein
   the auxiliary guide comprises a pair of auxiliary guides, the battery guide comprises a pair of battery guides, and
   a distance between the pair of auxiliary guides is less than a distance between the pair of battery guides.

10. The stand of claim 1, wherein
    a first connection is provided when the cleaner body is electrically connected to the first charging terminal, and
    a second connection is provided when the battery is electrically connected to the second charging terminal, and
    the first connection and the second connection are selectively provided.

11. The stand of claim 1, further comprising:
    a holding portion comprising the first charging terminal, the second charging terminal, and the battery guide; and
    a suction unit holder configured to receive a suction unit which is decoupled from the cleaner body,
    wherein the suction unit holder is rotatably coupled to the holding portion.

12. The stand of claim 11, wherein
    the suction unit holder comprises a connection port configured to be inserted into the suction unit, and
    the connection port is arranged to face upward or downward based on a rotation of the suction unit holder.

13. The stand of claim 12, wherein
    the suction unit holder is configured to be rotatable with respect a rotating shaft located on a rear side of a lower surface of the holding portion,
    wherein the rotating shaft is located on an outside of the connection port.

14. The stand claim 12, wherein
    the suction unit holder is arranged on a rear side of the holding portion when the connection port is arranged to face upward, and
    the suction unit holder is arranged on a lower side of the holding portion when the connection port is arranged to face downward.

15. The stand of claim 11, wherein
    when the holding portion is configured to stand on a floor, the lower surface of the holding portion is arranged at a predetermined angle with respect to the floor.

16. The stand of claim 1, further comprising:
a holding portion comprising the first charging terminal, the second charging terminal, and the battery guide; and
a fixer configured to be rotatably coupled to the holding portion, and comprising an upper holder and a lower holder configured to be movable with respect to the upper holder.

17. The stand of claim 16, wherein
the fixer is configured to grasp a structure between the upper holder and the lower holder by adjusting a distance between the lower holder and the upper holder.

18. The stand of claim 16, wherein
the fixer further comprises a lever configured to be rotatable so as to adjust the distance between the lower holder and the upper holder, and
the lever moves the lower holder in a direction toward the upper holder or moves the lower holder in a direction away from the upper holder according to a rotation direction thereof.

19. The stand of claim 16, wherein
the fixer further comprises a suction unit holder configured to receive a suction unit which is decoupled from the cleaner body, and
the suction unit holder comprises a connection port configured to be inserted into the suction unit and arranged on a lateral side of the holding portion.

20. A cleaning apparatus comprising:
a cleaner body configured to allow a suction unit and a battery to be coupled thereto; and
a stand configured to hold the cleaner body, the stand comprising:
  a first charging terminal configured to be electrically connected to the cleaner body when the battery is coupled to the cleaner body and the cleaner body is held by the stand;
  a first seating portion on which the cleaner body is to be seated to be connected to the first charging terminal;
  a second charging terminal configured to be electrically connected to the battery when the battery is separated from the cleaner body; and
  a second seating portion on which the battery is to be seated to be connected to the second charging terminal, the second seating portion configured to be located above the first seating portion on the stand and deeper than the first seating portion on the stand.

21. The cleaning apparatus of claim 20, wherein
the battery is electrically connected to the first charging terminal through the cleaner body by being mounted to the cleaner body, and the battery is electrically connected to the second charging terminal by being seated on the second seating portion.

22. The cleaning apparatus of claim 20, wherein
the stand further comprises a battery guide configured to guide the battery when attached to the cleaner body to guide the cleaner body to be connected to the first charging terminal when the cleaner body is held by the stand, and configured to guide the battery to be connected to the second charging terminal when the battery is separated from the cleaner body.

23. The cleaning apparatus of claim 22, wherein
a lower end of the battery guide is configured to come into contact with the battery when the cleaner body is seated on the first seating portion, and
the lower end of the battery guide is configured to be spaced a predetermined distance from the battery when the battery is seated on the second seating portion.

24. The cleaning apparatus of claim 22, wherein
the suction unit holder comprises a connection port configured to be inserted into the suction unit, and
the connection port is arranged to face upward or downward based on a rotation of the suction unit holder.

25. The cleaning apparatus of claim 20, wherein
the battery is arranged to face in a first direction with respect to the stand when the cleaner body is seated on the first seating portion, and
the battery is arranged to face in a second direction opposite to the first direction with respect to the stand when the battery is seated on the second seating portion.

26. The cleaning apparatus of claim 20, wherein
the stand further comprises
  a holding portion comprising the first charging terminal, the second charging terminal, the first seating portion, and the second seating portion; and
  a suction unit holder configured to receive a suction unit which is decoupled from the cleaner body, and
the suction unit holder is rotatably coupled to the holding portion.

27. A stand configured to hold a cleaner having a cleaner body configured to receive a battery, comprising:
a first charging terminal configured to be electrically connected to the cleaner body when the cleaner body is held by the stand;
a second charging terminal configured to be electrically connected to the battery when the battery is separated from the cleaner body and held by the stand;
a battery guide configured to guide a movement of the battery when the cleaner body is to be connected to the first charging terminal or when the battery is to be connected to the second charging terminal; and
a suction unit holder configured to receive a suction unit decoupled from the cleaner body, the suction unit holder configured to be rotatable to allow the suction unit to face upward or downward.

\* \* \* \* \*

UNITED STATES PATENT AND TRADEMARK OFFICE
CERTIFICATE OF CORRECTION

| | | |
|---|---|---|
| PATENT NO. | : 11,583,156 B2 | Page 1 of 1 |
| APPLICATION NO. | : 16/989262 | |
| DATED | : February 21, 2023 | |
| INVENTOR(S) | : Donghyun Lee et al. | |

It is certified that error appears in the above-identified patent and that said Letters Patent is hereby corrected as shown below:

In the Claims

Column 24, Line 57:
In Claim 14, after "stand" insert --of--.

Signed and Sealed this
Eighteenth Day of April, 2023

*Katherine Kelly Vidal*

Katherine Kelly Vidal
*Director of the United States Patent and Trademark Office*